(12) United States Patent
Nelson et al.

(10) Patent No.: US 10,154,733 B2
(45) Date of Patent: *Dec. 18, 2018

(54) MODULAR FURNITURE ASSEMBLY WITH MOUNTING PLATFORM

(71) Applicant: THE LOVESAC COMPANY, Stamford, CT (US)

(72) Inventors: Shawn D. Nelson, Washington, UT (US); David M. Underwood, Hurricane, UT (US); Spencer Pearson, Midvale, UT (US)

(73) Assignee: THE LOVESAC COMPANY, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/826,090

(22) Filed: Nov. 29, 2017

(65) Prior Publication Data

US 2018/0078041 A1 Mar. 22, 2018

Related U.S. Application Data

(63) Continuation of application No. 15/058,656, filed on Mar. 2, 2016, which is a continuation-in-part of (Continued)

(51) Int. Cl.
*A47C 7/00* (2006.01)
*A47C 7/02* (2006.01)
(Continued)

(52) U.S. Cl.
CPC ............... *A47C 4/028* (2013.01); *A47C 7/18* (2013.01); *A47C 7/20* (2013.01); *A47C 13/005* (2013.01);
(Continued)

(58) Field of Classification Search
CPC ..... A47C 13/005; A47C 17/045; A47C 3/029; A47C 7/002; A47C 4/028; A47C 15/002;
(Continued)

(56) References Cited

U.S. PATENT DOCUMENTS 1,236,234 A 8/1917 Troje
2,723,896 A 11/1955 Wurtz
(Continued)

FOREIGN PATENT DOCUMENTS

CH 403203 6/1966
CN 201022532 Y 2/2008
(Continued)

OTHER PUBLICATIONS

U.S. Appl. No. 11/449,074, Oct. 7, 2008, Restriction Requirement.
(Continued)

*Primary Examiner* — Rodney B White
(74) *Attorney, Agent, or Firm* — Workman Nydegger

(57) ABSTRACT

A modular furniture assembly includes: a base member having a frame assembly, a transverse member having a frame assembly, a foot configured to contact a support surface, and a mounting platform having a plurality of apertures therethrough. The mounting platform is configured to be mounted on the base member frame assembly and the transverse member frame assembly, thereby connecting the frame assemblies. The foot is selectively mounted on the mounting platform, such that the foot is configured to contact the support surface when the modular furniture assembly is in an upright configuration. The mounting platform connects the base and transverse member frame assemblies together and also acts as a platform for receiving a variety of different types of feet.

20 Claims, 21 Drawing Sheets

Related U.S. Application Data application No. 14/332,705, filed on Jul. 16, 2014, now Pat. No. 9,277,826, which is a continuation of application No. 13/164,721, filed on Jun. 20, 2011, now Pat. No. 8,783,778, which is a continuation-in-part of application No. 12/484,931, filed on Jun. 15, 2009, now Pat. No. 7,963,612, which is a continuation-in-part of application No. 11/449,074, filed on Jun. 8, 2006, now Pat. No. 7,547,073, which is a continuation-in-part of application No. 11/149,913, filed on Jun. 10, 2005, now Pat. No. 7,213,885, which is a continuation-in-part of application No. 14/993,533, filed on Jan. 12, 2016, now Pat. No. 10,070,725, which is a continuation-in-part of application No. 12/967,671, filed on Dec. 14, 2010, now Pat. No. 9,277,813.

(60) Provisional application No. 62/210,238, filed on Aug. 26, 2015, provisional application No. 61/413,125, filed on Nov. 12, 2010.

(51) Int. Cl.
*A47C 3/02* (2006.01)
*F16M 11/16* (2006.01)
*F16B 7/04* (2006.01)
*A47B 91/00* (2006.01)
*A47C 4/02* (2006.01)
*F16B 1/00* (2006.01)
*F16B 12/00* (2006.01)
*A47C 7/18* (2006.01)
*A47C 7/20* (2006.01)
*A47C 13/00* (2006.01)
*A47C 17/04* (2006.01)
*A47C 15/00* (2006.01)
*A47C 31/00* (2006.01)

(52) U.S. Cl.
CPC .......... *A47C 15/002* (2013.01); *A47C 17/045* (2013.01); *A47C 31/003* (2013.01); *F16B 1/00* (2013.01); *F16B 12/00* (2013.01); *F16B 2001/0028* (2013.01); *F16B 2001/0035* (2013.01); *Y10T 29/49826* (2015.01); *Y10T 403/7164* (2015.01); *Y10T 403/7176* (2015.01)

(58) Field of Classification Search
CPC ........... A47C 7/18; A47C 7/20; A47C 31/003; F16B 1/00; F16B 12/00
USPC .............. 297/440.1, 440.14, 440.15, 440.16, 297/452.27, 271.6, 272.1; 403/395, 397; 248/345.1, 188, 188.2, 188.8, 188.9
See application file for complete search history.

(56) References Cited

U.S. PATENT DOCUMENTS

| | | | |
|---|---|---|---|
| 2,751,969 A | 6/1956 | Kruijt | |
| 2,793,685 A | 5/1957 | Spitz | |
| 2,870,824 A | 1/1959 | LeBarre | |
| 3,030,146 A | 4/1962 | Morris | |
| 3,137,012 A | 6/1964 | Halterman | |
| 3,604,027 A | 9/1971 | Konno | |
| 3,606,461 A | 9/1971 | Moriyama | |
| 3,669,494 A | 6/1972 | Lohmeyer | |
| 3,706,473 A | 12/1972 | Mullen | |
| 3,787,909 A | 1/1974 | Johnson | |
| 3,811,728 A | 5/1974 | Redemske | |
| 3,944,281 A | 3/1976 | Piretti | |
| 3,973,800 A | 8/1976 | Kogan | |
| 4,045,090 A | 8/1977 | Fleisch et al. | |
| 4,047,773 A | 9/1977 | Semany | |
| 4,077,666 A | 3/1978 | Heumann | |
| 4,140,065 A | 2/1979 | Chacon | |
| 4,305,616 A | 12/1981 | Martinez | |
| 4,509,219 A | 4/1985 | Yagi | |
| 4,591,289 A | 5/1986 | Vickers et al. | |
| 4,626,218 A | 12/1986 | Wright | |
| 4,682,818 A | 7/1987 | Morell | |
| 4,753,480 A | 6/1988 | Morell | |
| 4,893,958 A | 1/1990 | Wieland | |
| 5,112,110 A | 5/1992 | Perkins | |
| 5,189,747 A | 9/1993 | Mundy et al. | |
| 5,322,345 A | 6/1994 | Desser et al. | |
| 2,701,009 A | 2/1995 | Richard | |
| 5,492,399 A | 2/1996 | Tillack | |
| 5,544,938 A | 8/1996 | Saul et al. | |
| 5,738,414 A | 4/1998 | Wieland et al. | |
| 5,867,849 A | 2/1999 | Pontrello | |
| 5,890,767 A | 4/1999 | Chang | |
| 6,063,007 A | 5/2000 | Sithole | |
| 6,151,765 A | 11/2000 | Asplund | |
| 6,216,894 B1 | 4/2001 | Hendricks | |
| 6,241,317 B1 | 6/2001 | Wu | |
| 6,267,446 B1 | 7/2001 | Wieland et al. | |
| 6,796,614 B1 | 9/2004 | Paul | |
| 6,824,220 B1 | 11/2004 | Davison | |
| 7,020,911 B2 | 4/2006 | Oldham | |
| 7,181,783 B2 | 2/2007 | O'Reilly | |
| 7,213,885 B2 | 5/2007 | White et al. | |
| 7,252,339 B2 | 8/2007 | Owens | |
| 7,296,859 B1 | 11/2007 | Branch, III | |
| 7,322,644 B2 | 1/2008 | Bigolin | |
| 7,399,034 B2 | 7/2008 | Fullmer | |
| 7,419,220 B2 | 9/2008 | White et al. | |
| 7,448,689 B2 | 11/2008 | Carter et al. | |
| 7,481,496 B2 | 1/2009 | Smith | |
| 7,547,073 B2 | 6/2009 | White et al. | |
| 7,892,065 B2 | 2/2011 | Vincenteli | |
| 7,941,882 B1 | 5/2011 | Strozer | |
| 7,963,612 B2 | 6/2011 | Nelson et al. | |
| 8,479,685 B2 | 7/2013 | Sprung | |
| 8,528,972 B2 | 9/2013 | Johnsson | |
| 8,783,778 B2 | 7/2014 | Nelson et al. | |
| 9,277,813 B2 | 3/2016 | Nelson et al. | |
| 9,277,826 B2 | 3/2016 | Nelson et al. | |
| 2004/0021359 A1 | 2/2004 | Chang | |
| 2005/0146179 A1* | 7/2005 | Murphy | A47C 1/124 297/248 |
| 2006/0279124 A1 | 12/2006 | White et al. | |
| 2007/0085406 A1 | 4/2007 | White et al. | |
| 2007/0257539 A1 | 11/2007 | White et al. | |
| 2009/0251250 A1 | 10/2009 | Tait | |
| 2009/0315382 A1 | 12/2009 | Nelson et al. | |
| 2010/0050911 A1 | 3/2010 | Rouillard | |
| 2010/0196088 A1 | 8/2010 | Johnsson | |
| 2011/0233976 A1 | 9/2011 | Hanson et al. | |
| 2011/0298340 A1 | 12/2011 | Nelson et al. | |
| 2012/0119629 A1 | 5/2012 | Nelson et al. | |
| 2014/0368010 A1 | 12/2014 | Nelson et al. | |
| 2016/0174715 A1 | 6/2016 | Nelson et al. | |
| 2016/0206100 A1 | 7/2016 | Nelson et al. | |
| 2017/0143122 A1* | 5/2017 | Nelson | A47C 1/0352 |
| 2017/0367486 A1* | 12/2017 | Nelson | A47C 4/028 |
| 2018/0000244 A1* | 1/2018 | Nelson | A47C 1/0352 |
| 2018/0098631 A1 | 4/2018 | Nelson et al. | |
| 2018/0213943 A1* | 8/2018 | Kuhl | A47C 13/005 |

FOREIGN PATENT DOCUMENTS

| | | |
|---|---|---|
| DE | 1429323 | 10/1968 |
| DK | 2213205 T3 | 4/2013 |
| EP | 2213205 A1 | 4/2010 |
| JP | 53-6411 | 1/1978 |
| JP | S53-6411 | 1/1978 |
| JP | 2002-045256 | 2/2002 |

(56) References Cited

FOREIGN PATENT DOCUMENTS

| WO | 2006135509 | 12/2006 |
|---|---|---|
| WO | 2006135855 | 12/2006 |

OTHER PUBLICATIONS

U.S. Appl. No. 14/993,533, Oct. 6, 2017, Office Action.
U.S. Appl. No. 11/149,913, Aug. 15, 2006, Office Action.
U.S. Appl. No. 11/149,913, Dec. 12, 2006, Notice of Allowance.
U.S. Appl. No. 11/149,913, Jan. 12, 2007, Corrective Notice of Allowance.
U.S. Appl. No. 11/149,913, Apr. 18, 2007, Issue Notification.
U.S. Appl. No. 11/449,074, May 6, 2009, Notice of Allowance.
U.S. Appl. No. 11/449,074, Mar. 3, 2009, Office Action.
U.S. Appl. No. 11/449,074, May 27, 2009, Issue Notification.
U.S. Appl. No. 11/745,325, Oct. 12, 2007, Office Action.
U.S. Appl. No. 11/745,325, May 28, 2008, Notice of Allowance.
U.S. Appl. No. 11/745,325, Aug. 13, 2008, Issue Notification.
U.S. Appl. No. 12/484,931, Sep. 10, 2010, Office Action.
U.S. Appl. No. 12/484,931, Oct. 21, 2010, Notice of Allowance.
U.S. Appl. No. 12/484,931, Jan. 5, 2011, Issue Notification.
U.S. Appl. No. 12/484,931, Feb. 11, 2011, Notice of Allowance.
U.S. Appl. No. 12/484,931, Jun. 1, 2011, Issue Notification.
U.S. Appl. No. 12/967,671, Jul. 19, 2013, Office Action.
U.S. Appl. No. 12/967,671, Feb. 14, 2014, Final Office Action.
U.S. Appl. No. 12/967,671, Jun. 19, 2014, Office Action.
U.S. Appl. No. 12/967,671, Jan. 12, 2015, Final Office Action.
U.S. Appl. No. 12/967,671, May 6, 2015, Office Action.
U.S. Appl. No. 12/967,671, Nov. 9, 2015, Notice of Allowance.
U.S. Appl. No. 12/967,671, Feb. 17, 2016, Issue Notification.
U.S. Appl. No. 13/164,721, Feb. 27, 2013, Office Action.
U.S. Appl. No. 13/164,721, Jul. 11, 2013, Office Action.
U.S. Appl. No. 13/164,721, Oct. 15, 2013, Notice of Allowance.
U.S. Appl. No. 13/164,721, Feb. 12, 2014, Issue Notification.
U.S. Appl. No. 13/164,721, Mar. 18, 2014, Notice of Allowance.
U.S. Appl. No. 13/164,721, Jul. 2, 2014, Issue Notification.
U.S. Appl. No. 14/332,705, Jun. 15, 2015, Office Action.
U.S. Appl. No. 14/332,705, Oct. 30, 2015, Notice of Allowance.
U.S. Appl. No. 14/332,705, Feb. 17, 2016, Issue Notification.
U.S. Appl. No. 15/058,656, Oct. 21, 2016, Office Action.
U.S. Appl. No. 15/058,656, Apr. 25, 2017, Notice of Allowance.
U.S. Appl. No. 15/058,656, Aug. 23, 2017, Issue Notification.
U.S. Appl. No. 15/058,656, Sep. 18, 2017, Notice of Allowance.
Extended EP Search Report for EP 06770061.7, published May 10, 2013, (9 pages).
International Search Report & Written Opinion for WO2006/135509, published on Mar. 23, 2007, (10 pages).
International Search Report & Written Opinion for WO2006/135855, published on Nov. 29, 2006, (10 pages).
Japanese Utility Model Application No. Sho 56-102375 (Japanese Utility Model Application laid-open No. Sho 58-8364), filed 1981, published 1983 and one page English Statement of Relevance (20 pages).
Tegu Magnetic Blocks, https://home.woot.com/plus/tegu-magnetic-blocks-13?ref=w_cnt_wp_5, accessed Feb. 2, 2018, copyright notice: 2004-2018 (2 pages).
Notice of Allowance issued in U.S. Appl. No. 14/993,533 dated May 10, 2018.
U.S. Appl. No. 10/070,725, filed Sep. 11, 2018, Nelson.
U.S. Appl. No. 15/836,020, Sep. 26, 2018, Notice of Allowance.

\* cited by examiner

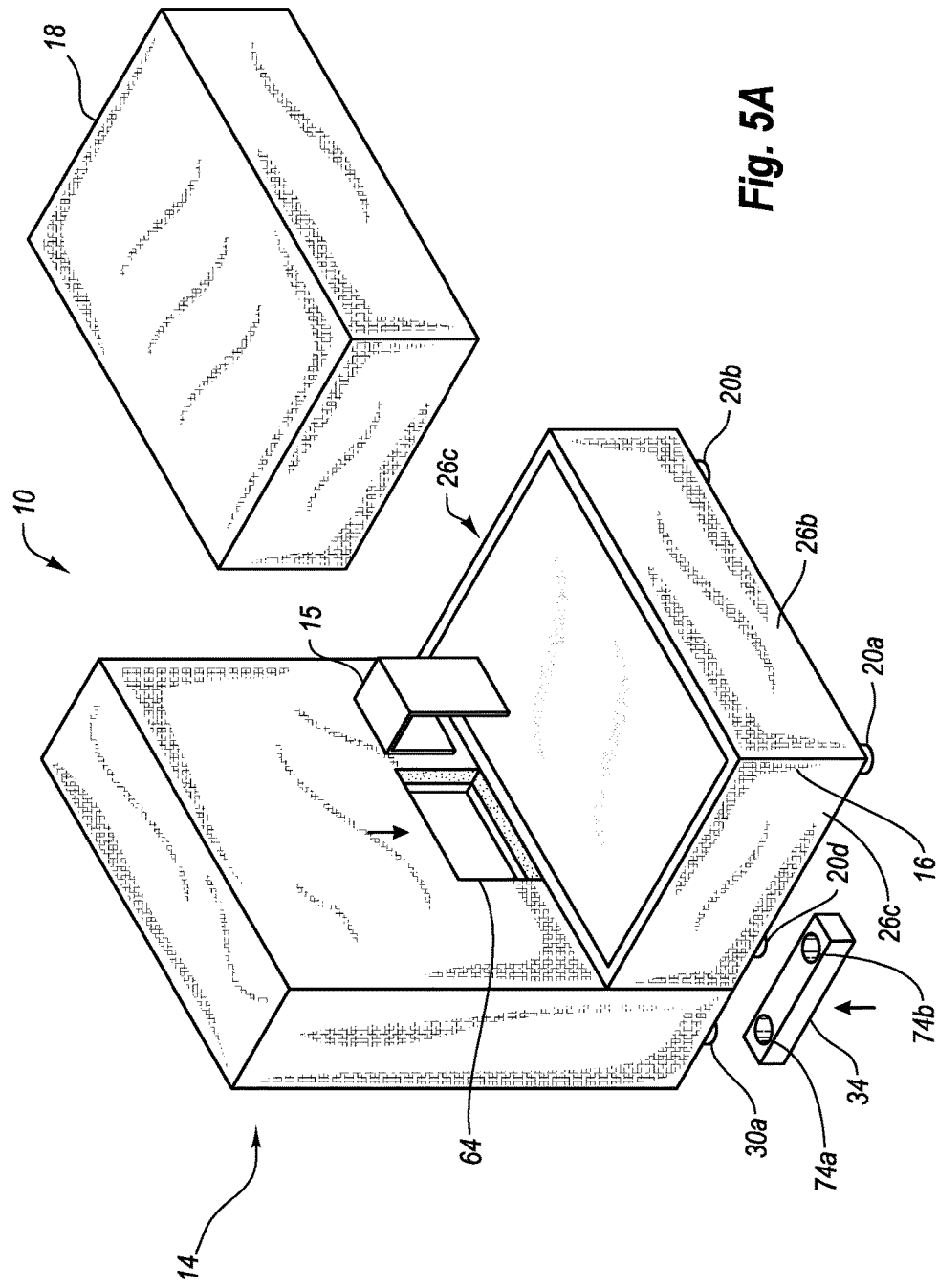

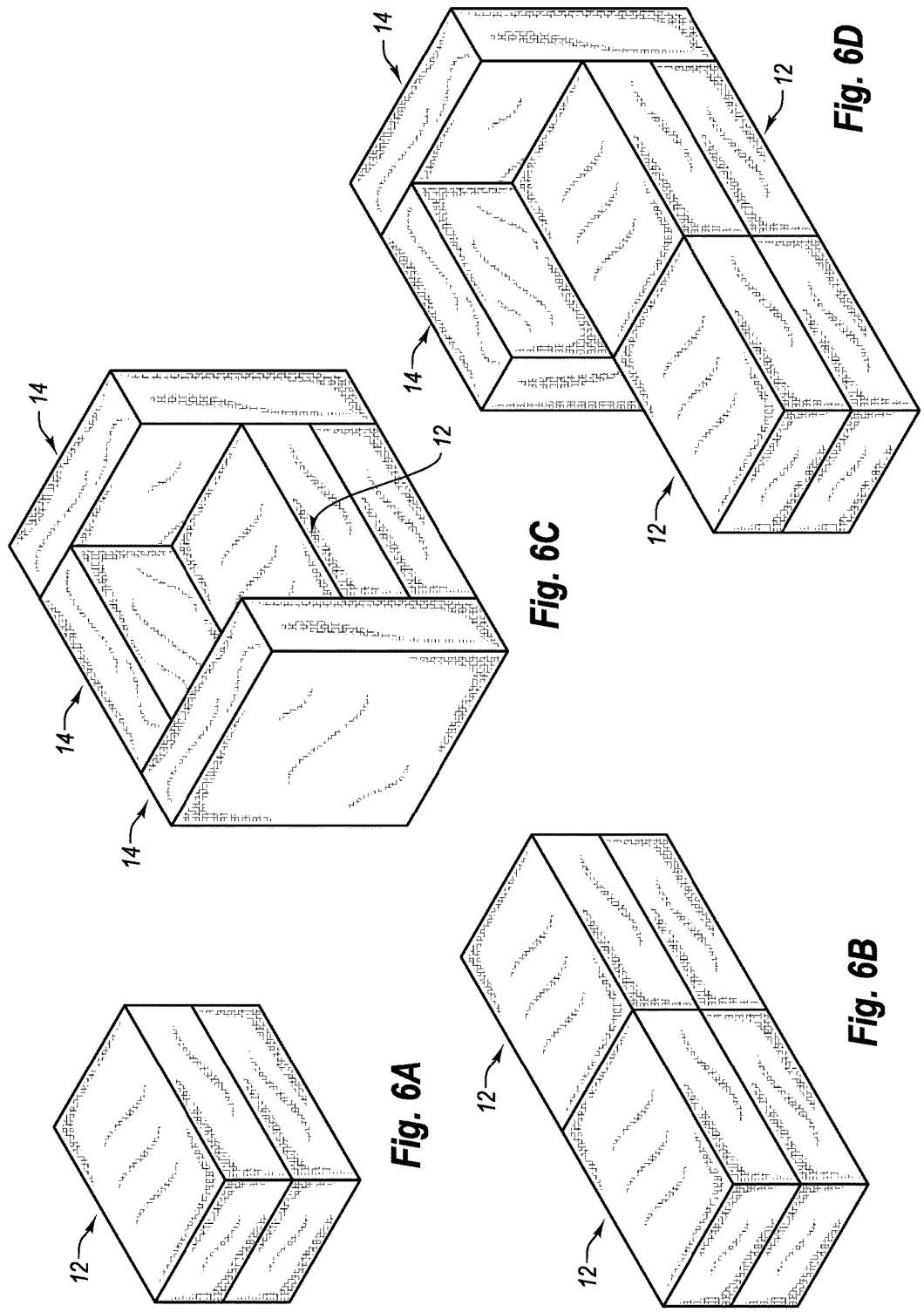

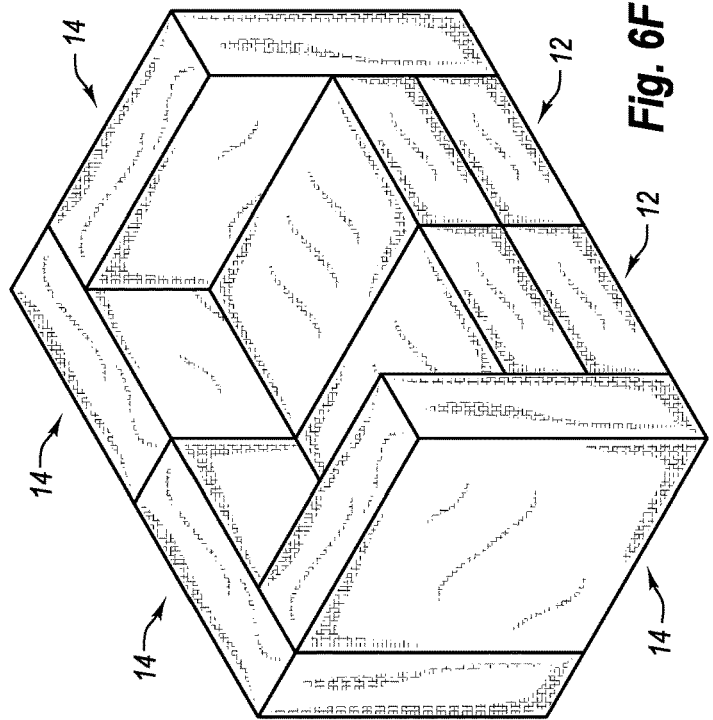
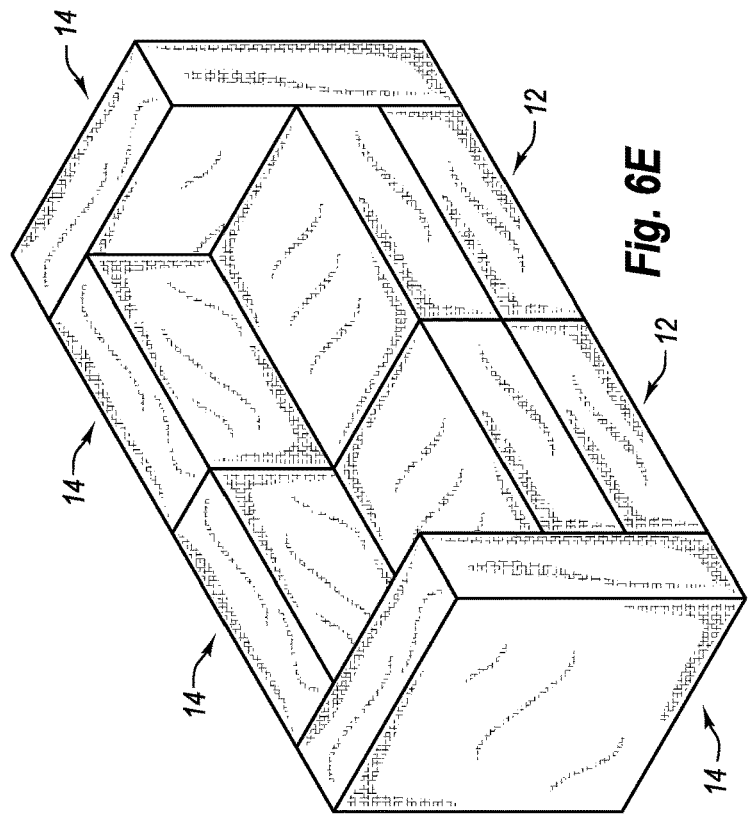

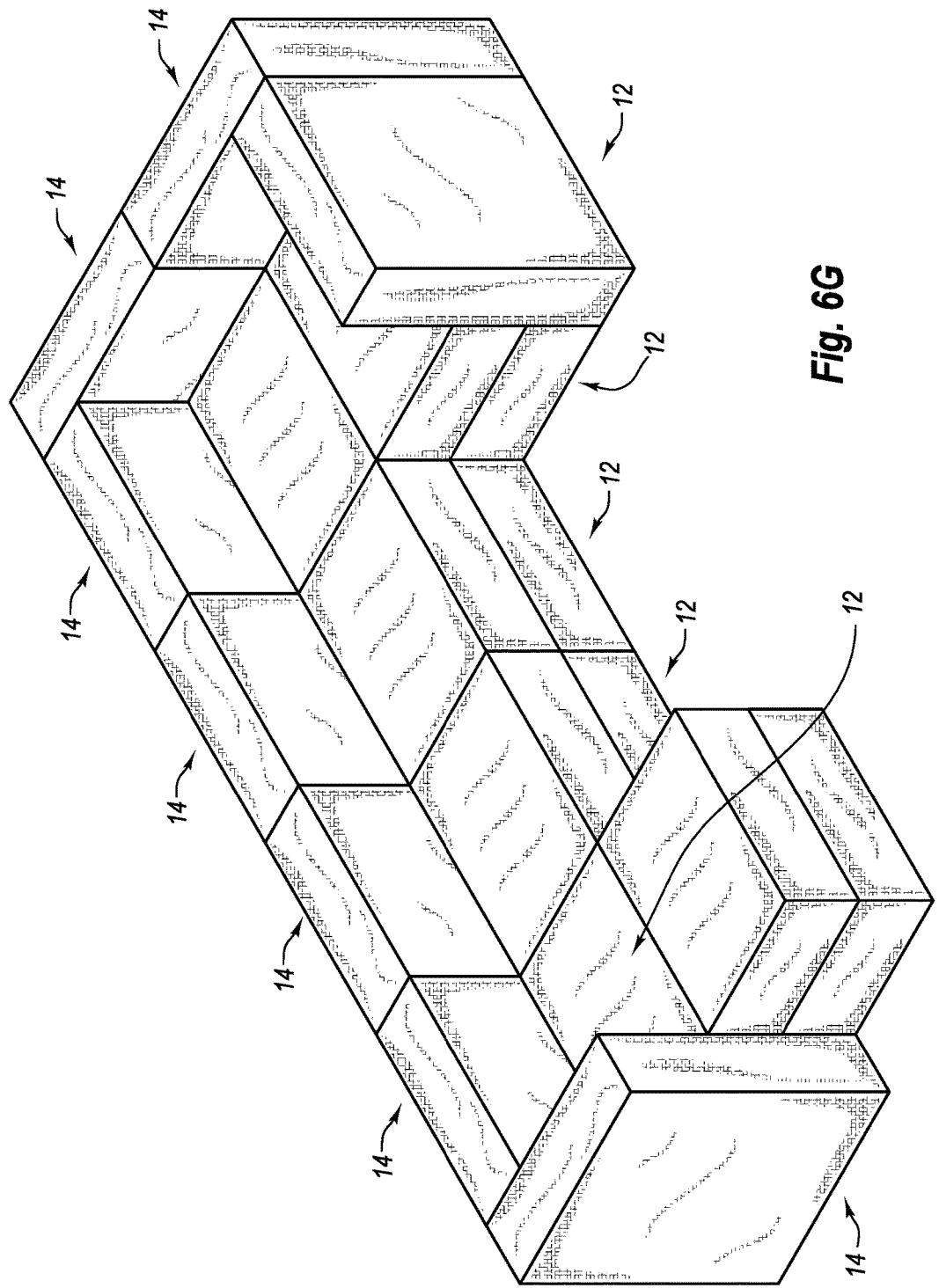

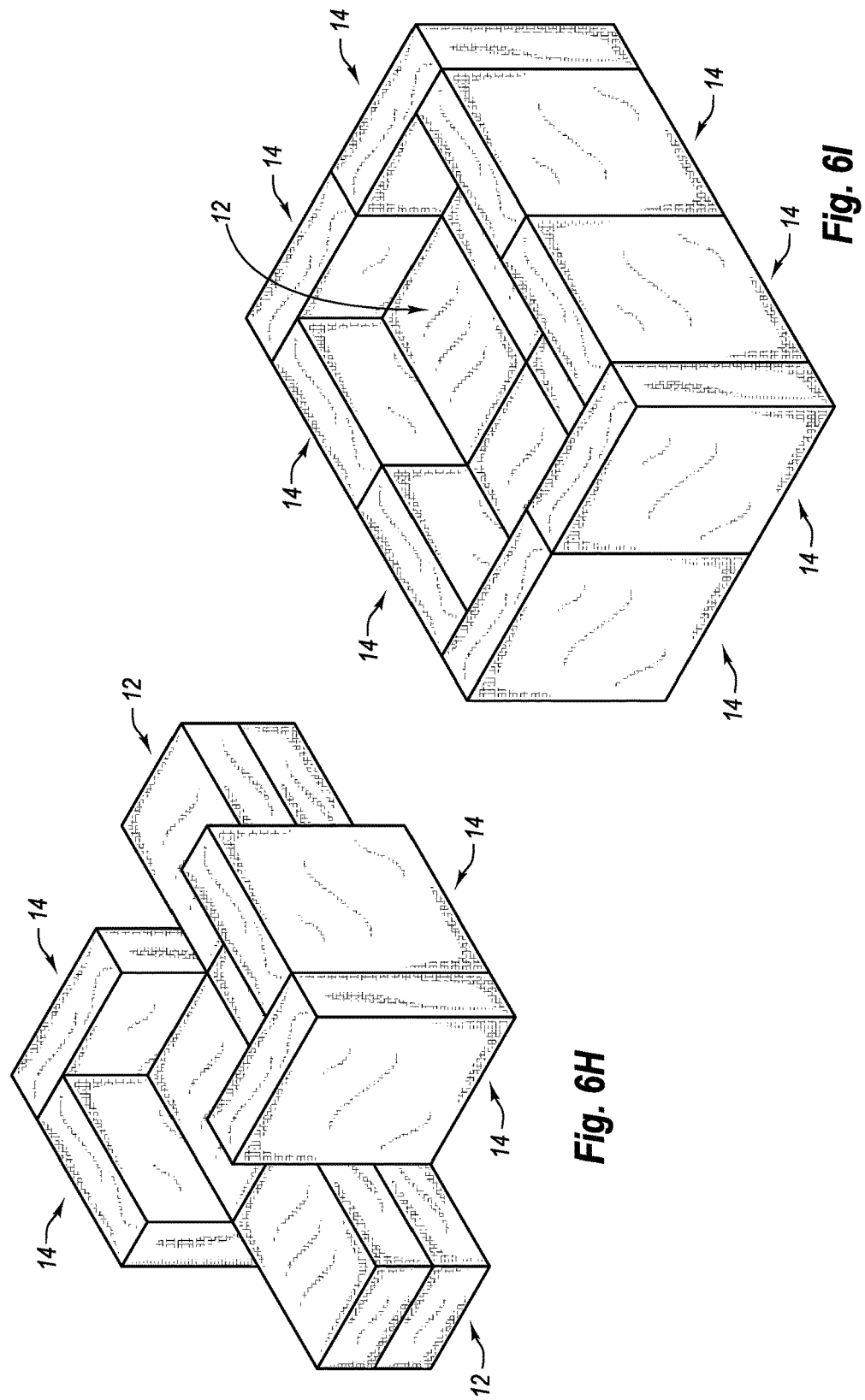

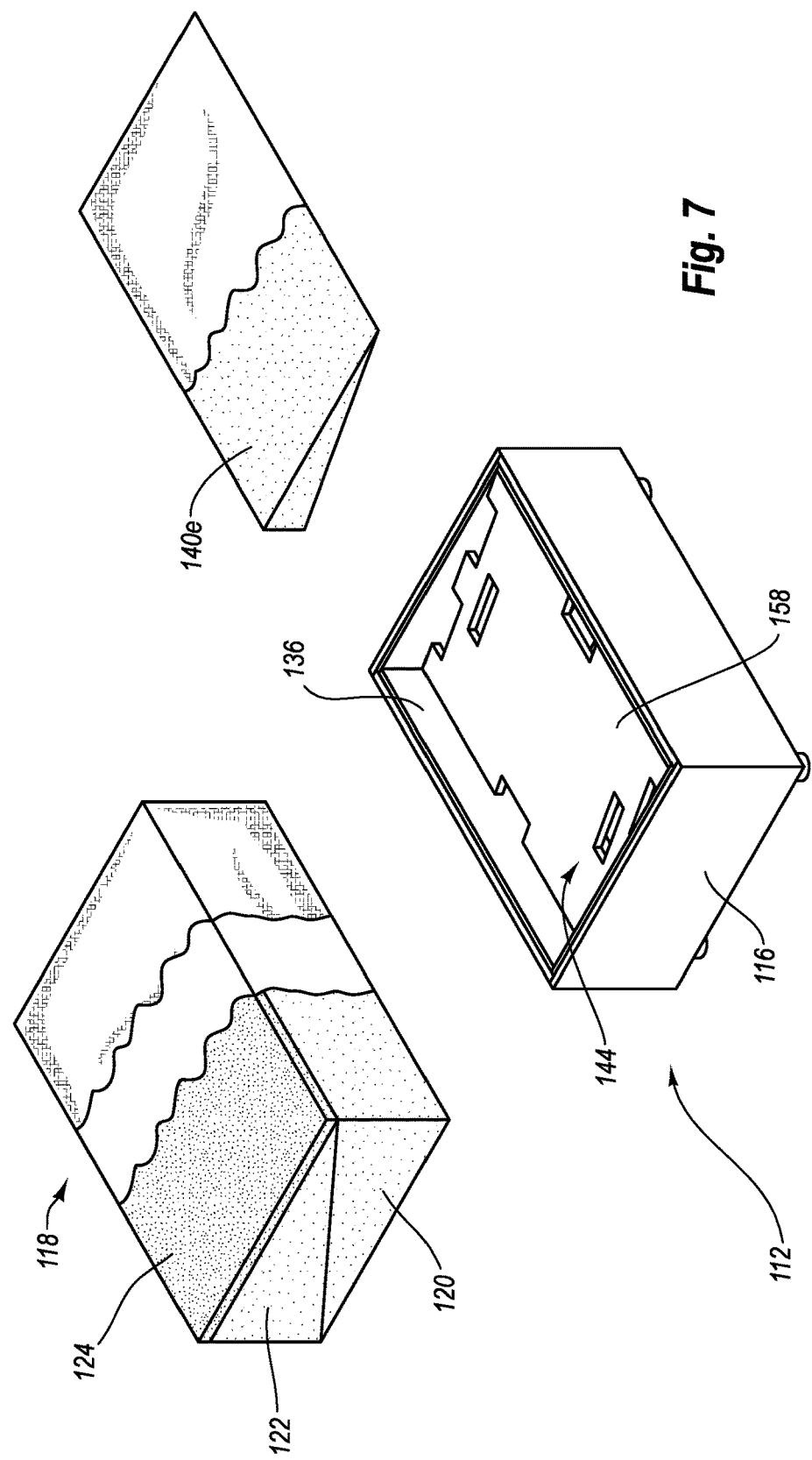

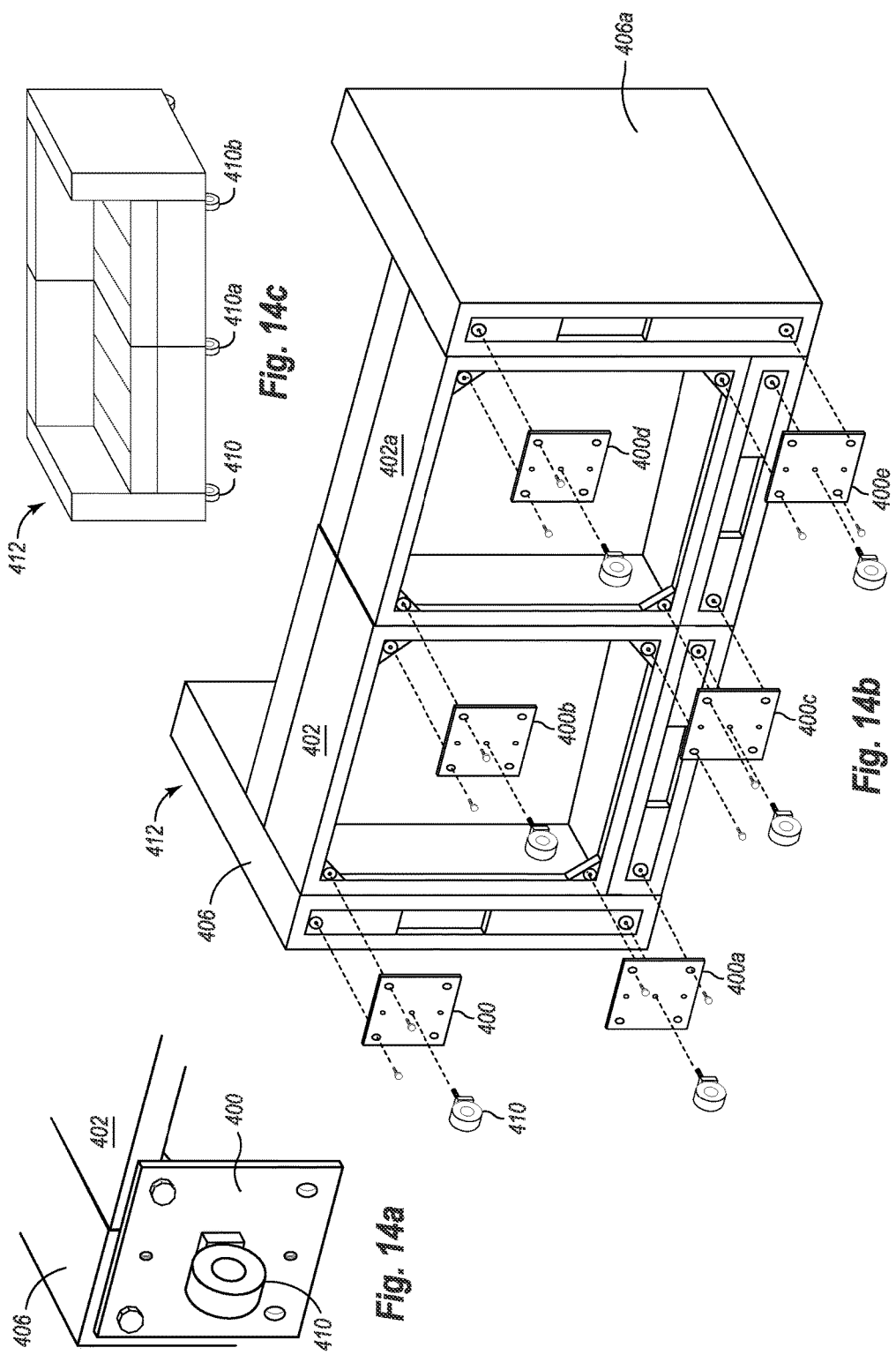

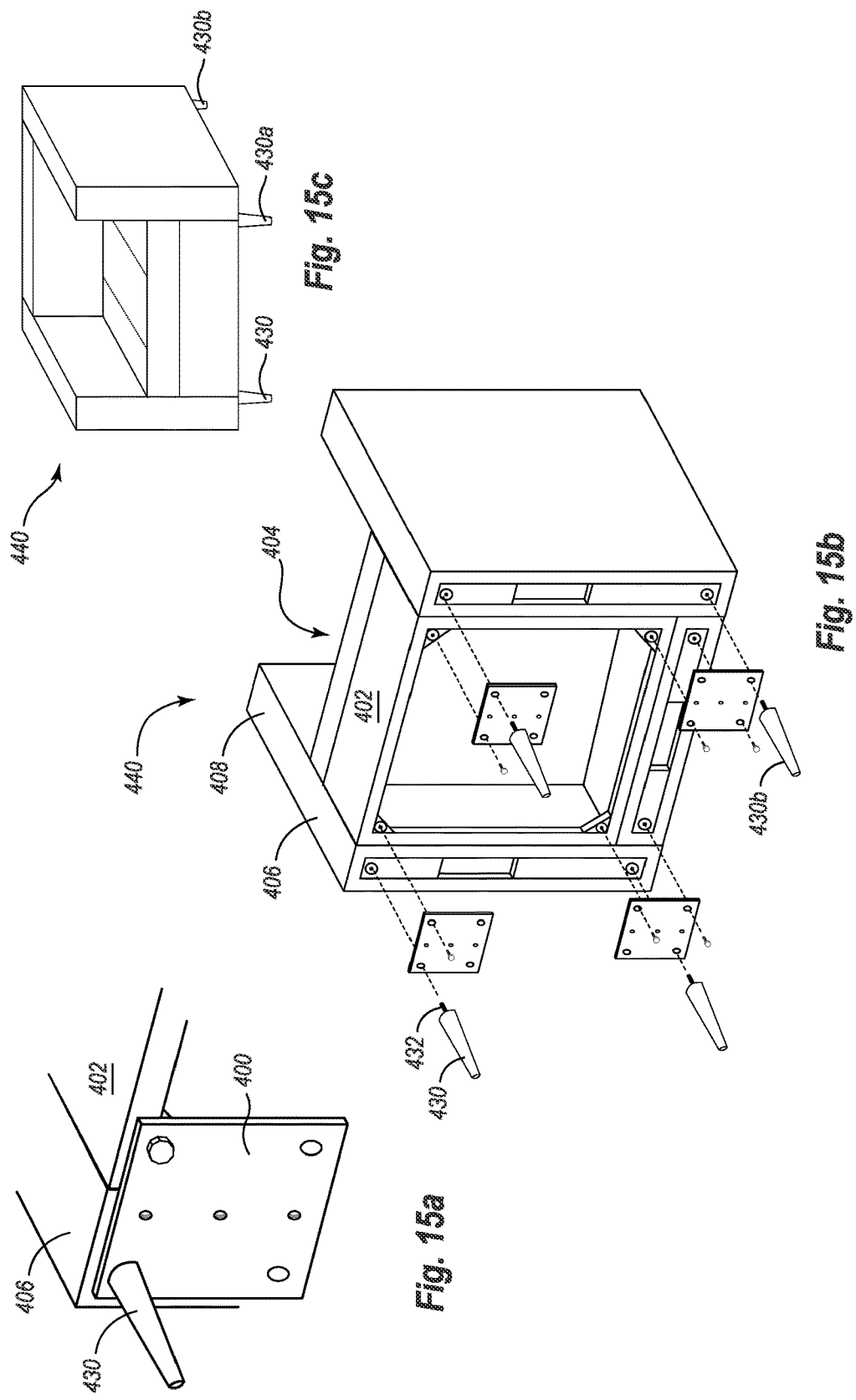

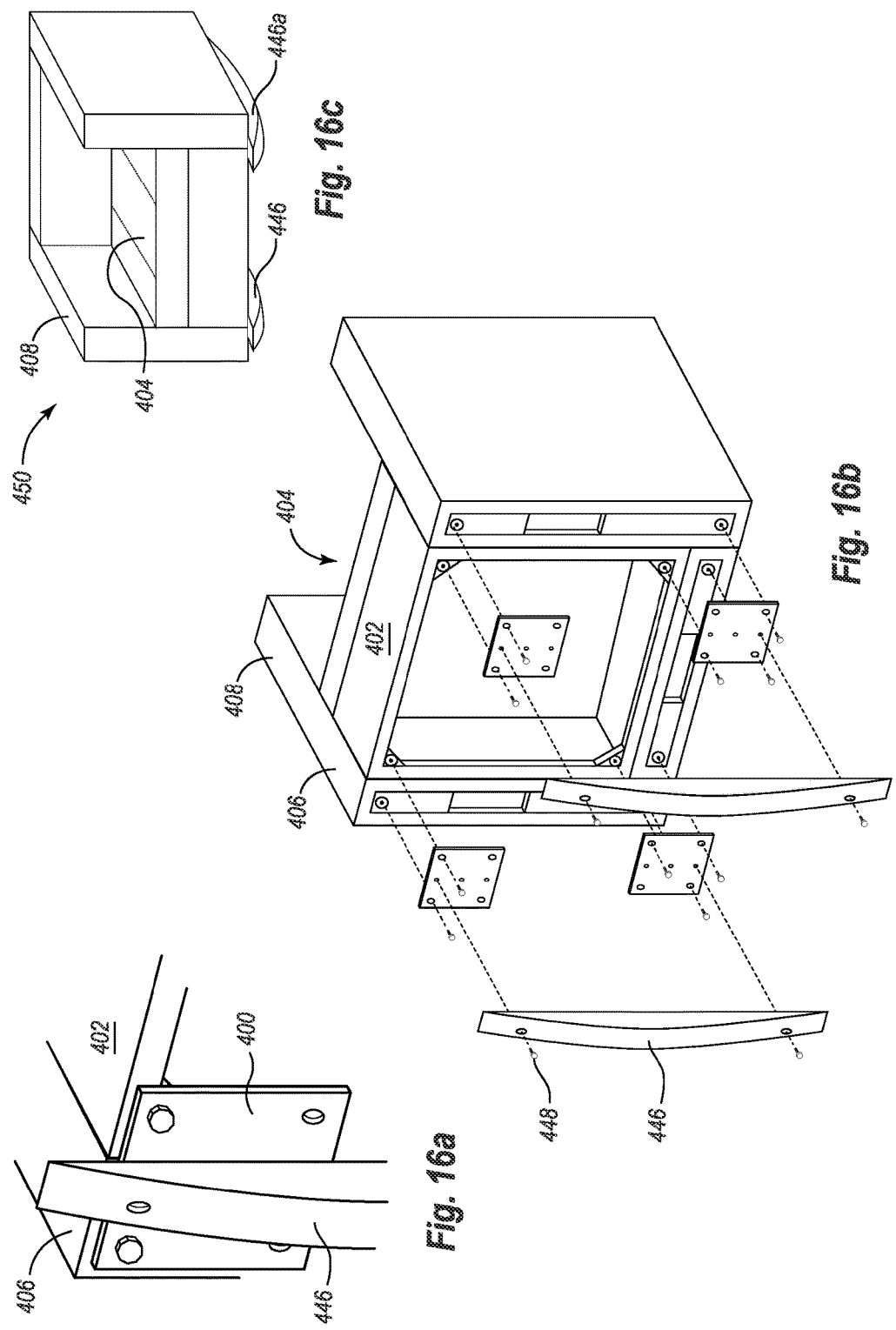

MODULAR FURNITURE ASSEMBLY WITH MOUNTING PLATFORM

RELATED APPLICATIONS

This application is a continuation of U.S. patent application Ser. No. 15/058,656, filed Mar. 2, 2016, now abandoned, entitled MODULAR FURNITURE ASSEMBLY WITH DUAL COUPLING MECHANISMS, which is:

(1) a continuation-in-part of U.S. patent application Ser. No. 14/332,705, filed Jul. 16, 2014, entitled MOUNTING PLATFORM FOR MODULAR FURNITURE ASSEMBLY, now U.S. Pat. No. 9,277,826, which is a continuation of U.S. patent application Ser. No. 13/164,721, filed Jun. 20, 2011, entitled MOUNTING PLATFORM FOR MODULAR FURNITURE ASSEMBLY, now U.S. Pat. No. 8,783,778, which is a continuation-in-part of U.S. patent application Ser. No. 12/484,931, filed Jun. 15, 2009, entitled MODULAR FURNITURE ASSEMBLY, now U.S. Pat. No. 7,963,612, which is a continuation-in-part of U.S. patent application Ser. No. 11/449,074, filed Jun. 8, 2006, entitled MODULAR FURNITURE ASSEMBLY, now U.S. Pat. No. 7,547,073, which is a continuation-in-part of U.S. patent application Ser. No. 11/149,913, filed Jun. 10, 2005, entitled MODULAR FURNITURE ASSEMBLY, now U.S. Pat. No. 7,213,885; and (2) which is also a continuation-in-part of U.S. patent application Ser. No. 14/993,533, filed Jan. 12, 2016, now U.S. Pat. No. 10,070,725 B2 entitled MODULAR FURNITURE ASSEMBLY WITH DUAL COUPLING MECHANISMS, which: (A) claims priority to and the benefit of U.S. Provisional Patent Application Ser. No. 62/210,238, filed Aug. 26, 2015, entitled MODULAR FURNITURE ASSEMBLY WITH MAGNETIC AND MECHANICAL COUPLING; and (B) is a continuation-in-part of U.S. patent application Ser. No. 12/967,671, filed Dec. 14, 2010, entitled MODULAR FURNITURE ASSEMBLY AND DISPLAY KIT WITH MAGNETIC COUPLING ASSEMBLY, now U.S. Pat. No. 9,277,813, which claims priority to and the benefit of U.S. Provisional Patent Application Ser. No. 61/413,125, filed Nov. 12, 2010, entitled MODULAR FURNITURE ASSEMBLY AND DISPLAY KIT WITH MAGNETIC COUPLING ASSEMBLY. Each of the foregoing applications is incorporated herein, in its entirety, by reference.

BACKGROUND OF THE INVENTION

1. The Field of the Invention

The invention relates to the field of furniture. Particularly, the invention relates to a modular furniture assembly.

2. The Relevant Technology

A variety of shapes and sizes of furniture have been developed over the years to provide comfort and decoration. Consumers appreciate furniture that can serve multiple purposes and withstand the wear of everyday use without requiring much attention. Thus, what is desirable is furniture that is versatile, durable and relatively maintenance free.

Once purchased, consumers expect furniture that is already assembled or can be easily assembled. Once assembled, however, most furniture cannot be easily disassembled. Most furniture is assembled using nails, staples, epoxy or some other type of fastener. Further, various types of furniture have upholstery covering the fastener thus making it difficult to disassemble the furniture. This presents a challenge for consumers, especially when the furniture needs to be transported from one location to another.

Additionally, once assembled, consumers appreciate furniture which can be readily cleaned. Most upholstery is secured to the furniture through the use of nails and/or staples, thus making it difficult to remove and clean when soiled or stained.

One aspect that makes furniture cost-prohibitive is shipping and packaging. For example, a large piece of furniture requires a large amount of space during shipping. The non-solid shape of most furniture makes it difficult to maximize the space utilized when packaging and shipping furniture. This adds increased costs of shipping due to the amount of space the furniture requires, regardless if the furniture fills all or most of the required space.

Another aspect that makes furniture cost-prohibitive is the difficulty in stacking furniture. When large pieces of furniture are stacked, damage frequently occurs to the furniture on the bottom of the stack. This damage may result from the shape and non-solid nature of the packaged furniture. Even when furniture is disassembled and boxed in order to facilitate stacking, often there is still much wasted space. The wasted space not only increases the cost of shipping, but also provides for a less stable base for which to stack other pieces of furniture.

For those consumers who cannot afford many pieces of furniture, it is also desirable to have furniture which can provide multiple functions. For example, a futon bed serves the function of both a bed and a couch. However, futon beds are bulky, and thus subject to the cost factors described above. In addition, futon mattresses are often thin and uncomfortable both as a couch and as a bed.

BRIEF SUMMARY OF THE INVENTION

The invention relates to a modular furniture assembly that can be assembled, disassembled, rearranged, moved and cleaned in a quick and efficient manner with minimal effort. In an exemplary embodiment, the modular furniture assembly comprises a base, at least one transverse member and a coupler configured to facilitate the detachable coupling of the transverse member to the base so as to form a furniture assembly.

In one exemplary embodiment, the base serves as a support surface on which a user can sit, and the transverse member acts as a resting surface for a user's back or arm. The coupler is configured to allow a user to quickly couple or decouple the transverse member and the base with minimal effort without the use of a tool. The ease of coupling a transverse member to the base enables a consumer to easily form many configurations of furniture assemblies.

The base is configured such that it can be positioned adjacent the transverse member in a variety of ways and detachably coupled thereto so as to provide a variety of configurations of modular furniture assemblies. As such, many bases and transverse members can be utilized to form a variety of different furniture assemblies. For instance, one embodiment utilizes one base and one transverse member coupled together to form a chair. In another embodiment, three transverse members are coupled to one base to form an arm chair. Furthermore, the base(s) and transverse member(s) can be placed in a variety of different positions so as to form a variety of different chairs.

In one embodiment, the base and transverse member are sized and configured in a defined spatial relationship. For example, in such an embodiment, the length (x) of the base is substantially equal to the length (x') of the transverse member, and the length (x) of the base is substantially equal to the sum of the width (y) of the base and the width (z) of the transverse member. Thus, x is substantially equal to y+z. This relationship enables the convenient formation of a variety of different types, sizes and configurations of furniture assemblies.

In use, one or more bases having a substantially similar configuration can be employed with one or more transverse members having a substantially similar configuration. The standardized configuration of bases and transverse members enables a user to form a variety of different types and configurations of furniture assemblies. This also makes manufacturing convenient because a manufacturer can produce a series of bases that have a substantially similar configuration and a series of transverse members that have a substantially similar configuration, then arrange (or allow the end user to arrange) the bases and transverse members into a variety of configurations to form different types of furniture. The user can purchase one or more bases having the same configuration and one or more transverse members having the same configuration, then combine them to form a number of different furniture assemblies.

For example, a first base and a first transverse member can be employed to form a chair having a back rest. Second and third transverse members having a substantially similar configuration as the first transverse member can be added to form an armchair. Optionally, a couch can be formed by adding: (i) a second base having a substantially similar configuration as the first base; and (ii) second, third and fourth transverse members having a substantially similar configuration as the first transverse member. An endless variety of furniture assemblies can be formed by utilizing bases and transverse members having standardized, substantially similar configurations, respectively.

The spatial relationship further enables the manufacturer to proportionately size the bases and transverse members to form furniture assemblies for different sizes of individuals. For example, the bases and transverse members can be proportionately sized to form furniture assemblies for children. Likewise, the bases and transverse members can be proportionately sized to form furniture assemblies for adults, or even oversized adults. As such, the bases(s) and transverse members(s) of the present invention can be utilized to form a variety of sizes of furniture.

The configuration of the base and transverse member of the present invention provides many benefits to both the consumer and retailer. For example, the present invention enables the consumer to have a piece of furniture in a remote location where previously other pieces of furniture could not be moved due to their bulkiness and/or size. The present invention is easily disassembled, thus enabling a consumer to locate the base(s) and/or transverse member(s) in an otherwise inaccessible location and then assemble them to form a furniture assembly. Furthermore, the present invention enables a manufacturer and/or retailer to stock two pieces of furniture, i.e. a base and a transverse member. This is advantageous for shipping and storing. For instance, the manufacturer and/or retailer is only required to store two primary pieces and is able to stack the bases or transverse members having the same respective configuration on top of each other when loading and unloading from freight. Likewise, the bases and transverse members can be stacked in an orderly fashion in storage.

In addition, the transverse member and the base include removable outer liners. The removable outer liners allow a consumer to easily launder the furniture assembly. Further, utilizing a removable outer liner allows a consumer to interchange liners of different shades and styles to create a unique and customized furniture assembly. Thus, the furniture assembly of the present invention is versatile, modular, interchangeable and convenient.

In another alternative embodiment, a plurality of shapes of transverse members may be employed in order to achieve unique and useful furniture configurations.

Yet another aspect of the invention relates to a mounting platform that is selectively mounted on the frame assembly of the base and the frame assembly of the transverse member in order to allow various different types of feet, e.g., rollers, castors, rockers, and/or pegs to be employed as part of the modular furniture assembly.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 5a is a perspective view illustrating how the modular furniture assembly is assembled;

FIG. 6a illustrates a modular furniture assembly in the configuration of an ottoman;

FIG. 6b illustrates a modular furniture assembly in the configuration of a bench;

FIG. 6c illustrates a modular furniture assembly in the configuration of an arm chair;

FIG. 6d illustrates a modular furniture assembly in the configuration of a chaise;

FIG. 6e illustrates a modular furniture assembly in the configuration of a love seat;

FIG. 6f illustrates a modular furniture assembly in the configuration of a deep sofa;

FIG. 6g illustrates a modular furniture assembly in the configuration of a sectional;

FIG. 6h illustrates a modular furniture assembly in the configuration of a twister;

FIG. 6i illustrates a modular furniture assembly in the configuration of a playpen;

FIG. 7 is an exploded perspective view illustrating an alternative embodiment of the base;

FIGS. 14a-c illustrate mounting platforms mounted on the frame assemblies of adjacent bases and transverse members to thereby couple rollers to the bases and transverse members.

FIG. 14a illustrates a platform mounted on a base and transverse member and a foot in the form of a roller mounted in the center of the platform.

FIG. 14b is an exploded view of a plurality of platforms and feet being mounted on adjacent bases and transverse members in order to form the sofa assembly of FIG. 14c.

FIGS. 15a-c illustrate mounting platforms mounted on the frame assemblies of an adjacent base and transverse members with pegs mounted on the platforms and on transverse members.

FIG. 15a illustrates a platform mounted on a base frame assembly and transverse member frame assembly and a foot in the form of a peg mounted on the corner edges of the platform; the peg is further mounted through the platform to a transverse member frame assembly, thereby connecting a portion of the platform to a transverse member.

FIG. 15b is an exploded view of a plurality of platforms and feet being mounted on adjacent base frame assembly portions and transverse member frame assemblies in order to form the chair assembly of FIG. 15c.

FIGS. 16a-c illustrate mounting platforms mounted on the frame assemblies of an adjacent base and transverse members to thereby couple rocker members to the bases and transverse members.

FIG. 16a illustrates a platform mounted on a base and transverse member frame assembly and a foot in the form of a rocker member (shown in a cutaway view) mounted on the platform.

FIG. 16b is an exploded view of a plurality of platforms and feet being mounted on adjacent base frame assembly portions and transverse member frame assemblies in order to form the rocking chair of FIG. 16c.

DETAILED DESCRIPTION OF THE PREFERRED EMBODIMENTS

The invention relates to a modular furniture assembly that can be assembled, disassembled, rearranged, moved and cleaned in a quick and efficient manner with minimal effort.

The invention further relates to a modular furniture assembly that has a spatial relationship that enables a user to form a number of different furniture assemblies. In an exemplary embodiment, the modular furniture assembly comprises a base, at least one transverse member and a coupler configured to detachably couple the transverse member to the base so as to form a chair. The configuration of the base and transverse member enable a user to form a number of different furniture assemblies.

The base serves as a support surface on which a user can sit, and the transverse member acts as a resting surface for a user's back or arm. The base is configured such that the transverse member can be positioned adjacent the base in a variety of positions and detachably coupled thereto to form different types of furniture assemblies. The coupler is configured to allow a user to quickly couple or decouple the transverse member and the base with minimal effort without the use of a tool. The ease of coupling a transverse member to the base provides for the capability of easily forming many configurations of furniture assemblies. Many bases and transverse members can be utilized to form a variety of differing furniture assemblies. In addition, the base and transverse member can be proportionately sized to accommodate different sizes of individuals. As such, a variety of types, sizes and configurations of furniture can be made in a quick and convenient fashion by utilizing the present invention.

Figure 1:
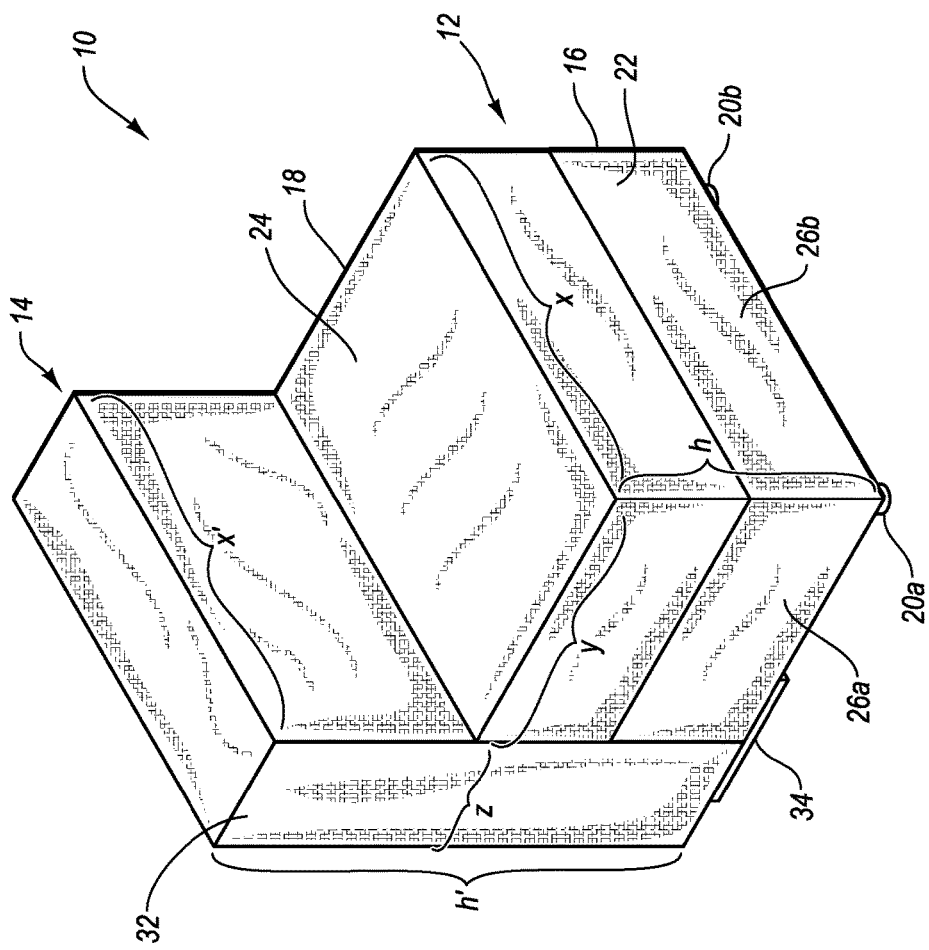
FIG. 1 is a perspective view illustrating a modular furniture assembly having a base coupled to a transverse member to form a chair.
Figure 4:
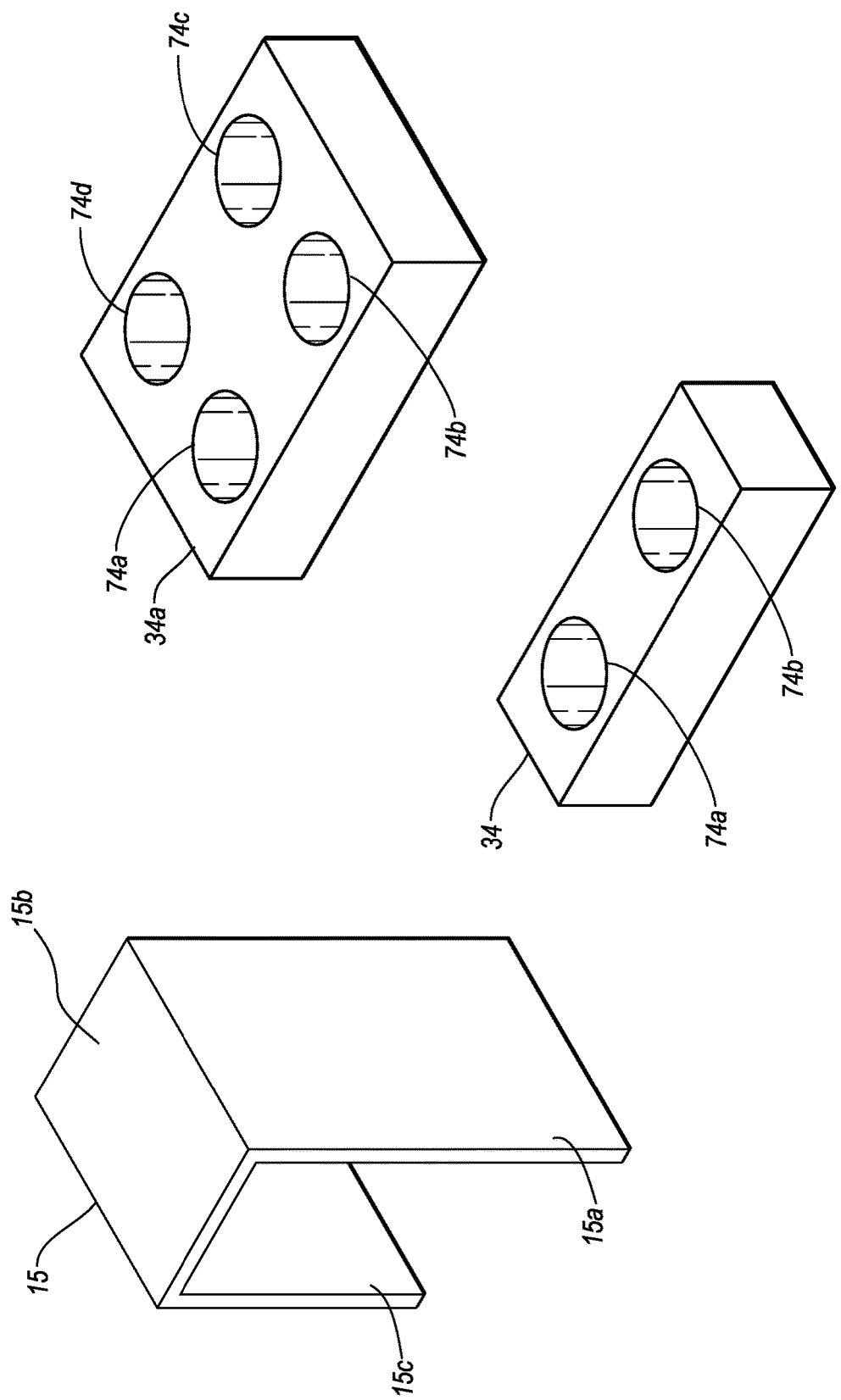
FIG. 4 is a perspective view of the coupler and the foot couplers.

FIG. 1 illustrates an exemplary embodiment of a modular furniture assembly 10. In the illustrated embodiment, modular furniture assembly 10 comprises a base 12 and a transverse member 14 detachably coupled to base 12 by a coupler 15 (FIG. 4). Base 12 and transverse member 14 are adapted to be detachably coupled to each other in a variety of ways and configurations so as to form a variety of unique and custom furniture assemblies. Further, base 12 and transverse member 14 are sized and configured according to a defined spatial relationship. The defined spatial relationship, as described more fully hereinafter, between base 12 and transverse member 14 enables: (i) the convenient formation of a variety of different types of furniture assemblies; (ii) the convenient formation of a variety of different configurations of furniture assemblies; and (iii) a manufacturer to proportionately size the bases and transverse members for different sizes of individuals, such as for children or for adults.

Base 12 is configured to provide a comfortable sitting surface for a consumer. Base 12 is also configured to be easily disassembled for rearranging, moving, storing and/or shipping. In this embodiment, base 12 comprises a frame assembly 16, a cushion 18 and a plurality of feet 20a-d mounted on frame assembly 16. Frame assembly 16 is configured to support the weight of a consumer while the consumer is sitting on base 12. Cushion 18 is configured to be mounted on frame assembly 16 so as to provide a useful and comfortable sitting area for a consumer. Cushion 18 can be easily mounted on or removed from frame assembly 16.

Feet 20a-d are coupled to the underside of frame assembly 16. Feet 20a-d can be coupled to frame assembly 16 in a variety of ways. In one embodiment, feet 20a-d are coupled by screws. In this embodiment, feet 20a-d can be easily coupled to and/or removed from frame assembly 16 so as to facilitate ease in packaging, shipping, storing, moving and/or replacing feet 20a-d. However, feet 20a-d can be coupled to frame assembly 16 in a more permanent fashion, such as with a nail, an epoxy or glue, or any combination thereof. Feet 20a-d facilitate the coupling of transverse member 14 to base 12 when used in connection with a foot coupler, such as foot coupler 34 and/or 34a. Feet 20a-d are further configured to support the weight of a consumer and to elevate base 12 above the floor. When feet 20a-d are coupled to frame assembly 16 by screws, the removability of feet 20a-d in conjunction with the removability of cushion 18 enables base 12 to be easily disassembled for rearranging, moving, storing and/or shipping.

Base 12 includes a plurality of abutting surfaces 26a-d that are configured to be positionable adjacent to and abut with an abutting surface 28 of transverse member 14. As will be discussed more fully herein, base 12 is configured such that transverse member 14 can be positioned adjacent any abutting surface 26a-d to form a variety of different furniture assemblies.

In the illustrated embodiment, base 12 and transverse member 14 have a defined spatial relationship. The spatial relationship between base 12 and transverse member 14 enables the formation of a variety of different types, sizes and configurations of furniture assemblies. In this embodiment, base has a length (x) and a width (y), wherein the length (x) of base 12 is greater than the width (y) of base 12, and transverse member 14 has a length (x') and a width (z), wherein the length (x') of transverse member 14 is greater than the width (z) of transverse member 14. In this embodiment, base 12 and transverse member 14 are configured such that the length (x) of base 12 is substantially equal to the length (x') of transverse member 14 and the length (x) of base 12 is substantially equal to the sum of the width (y) of base 12 and the width (z) of transverse member 14. As such, (x) is substantially equal to (y)+(z). This relationship of the length (x) of base 12 being substantially equal to the sum of the width (y) of base 12 and width (z) of transverse member 14 is the defined spatial relationship between base 12 and transverse member 14. Furthermore, the height (h') of transverse member 14 is substantially greater than the height (h) of base 12, such that transverse member 14 can be conveniently employed as a backrest or armrest while base 12 is employed as a seat.

This defined spatial relationship enables a user to conveniently form a variety of different types of furniture assemblies. For example, in the illustrated embodiment, a first base 12 and a first transverse member 14 are utilized to form a chair. Second and third transverse members 14 having a substantially similar configuration as the first transverse member 14 can be added to form an arm chair having a first arm rest and a second arm rest, as illustrated in FIG. 6c. As used herein, the phrase substantially similar configuration can mean that the bases and/or transverse members are respectively sized and configured so as to be interchangeable. Optionally, a couch can be formed by adding: (i) a second base 12 having a substantially similar configuration as the first base 12; and (ii) a second, third and fourth transverse member 14 having a substantially similar configuration as the first transverse member 14, as illustrated in FIG. 6e and FIG. 6f. This ability to add base(s) and/or transverse member(s) to form different types of furniture is how the defined spatial relationship enables a user to conveniently form a variety of different types of furniture.

As further shown in FIGS. 6e-f, the defined spatial relationship enables a user to conveniently form a variety of different configurations of furniture assemblies. For example, the couches formed by utilizing two bases 12 and four transverse members 14 can be arranged so as to form a love seat, as illustrated by FIG. 6e, or a deep sofa, as illustrated by FIG. 6f. The love seat of FIG. 6e and the deep sofa of FIG. 6f employ the same bases 12 and the same transverse members 14, but are arranged differently. Thus, the defined spatial relationship of the present invention enables a user to conveniently form a variety of different configurations of furniture assemblies.

The defined spatial relationship also enables a manufacturer to manufacture different sizes of bases and transverse members so as to accommodate different sizes of individuals. For example, a manufacturer can manufacture a base and a transverse member such that when the base and transverse member are detachably coupled together a furniture assembly is formed that is sized for a child, but may be too small for an adult to use comfortably. On the other hand, a manufacturer, utilizing the spatial relationship, can enlarge the size of the base(s) and transverse member(s) such that when the base(s) and transverse member(s) are coupled together a furniture assembly is formed that is sized to accommodate an adult comfortably. As such, the spatial relationship between base 12 and transverse member 14 enables the formation of a variety of different sizes of furniture assemblies.

With continued reference to FIG. 1, transverse member 14 is configured to provide lateral support to a consumer when base 12 is coupled thereto. Transverse member 14 can be positioned adjacent any abutting surface 26a-d of base 12 to form a variety of furniture assemblies. Feet 30a-b are coupled to the underside of traverse member 14. Feet 30a-b are configured to facilitate the coupling of transverse member 14 to base 12. Feet 30a-b are further configured to support the weight of a consumer and to elevate transverse member 14 above a floor on which transverse member 14 is positioned. Feet 30a-b can be coupled to transverse member 14 in a similar fashion as feet 20a-d are coupled to base 12.

In one embodiment, feet 30a-b are each positioned such that each are offset from the front and back surfaces and respective adjacent side surfaces of transverse member 14 an equal distance, the "offset distance." For example, if the width (z) of transverse member 14 is ten inches, the offset distance is five inches. Thus, feet 30a-b are each positioned five inches from the front surface and five inches from the back surface of transverse member 14 (i.e., in the middle of the front and back surfaces), and are each positioned five inches from respective adjacent side surfaces of transverse member 14. Similarly, feet 20a-d of base 12 are each positioned such that each are offset from respective adjacent abutting surfaces 26a-d the offset distance. As such, in one such embodiment: (i) foot 20a is offset from both abutting surface 26a and abutting surface 26b the offset distance; (ii) foot 20b is offset from both abutting surface 26b and abutting surface 26c the offset distance; (iii) foot 20c is offset from both abutting surface 26c and abutting surface 26d the offset distance; and (iv) foot 20d is offset from both abutting surface 26d and abutting surface 26a the offset distance.

In the illustrated embodiment, modular furniture assembly 10 further includes multiple foot couplers 34-35, which may be identical, for example. Foot couplers 34-35 are adapted to facilitate the coupling of transverse member 14 to base 12. Foot couplers 34-35 are further adapted to provide support to base 12 and transverse member 14 when coupled thereto. Foot coupler 34 utilizes foot 20d of base 12 and foot 30a of transverse member 14 which is adjacent to foot 20d of base 12 to facilitate coupling of transverse member 14 to base 12. Likewise, foot coupler 35 utilizes foot 20c of base 12 and adjacent foot 30b of transverse member 14 to facilitate coupling of transverse member 14 to base 12.

In the illustrated embodiment, traverse member 14, frame assembly 16 and cushion 18 each include a selectively removable outer liner 32, 22, 24, respectively. Removable outer liners 32, 22, 24 are configured to be easily removed and reattached so as to provide easy laundering thereof, as discussed more fully herein. Further, the selective removability of outer liners 32, 22, 24 allows a consumer to mix and match colors and designs to create a unique and custom furniture assembly.

Figure 2:
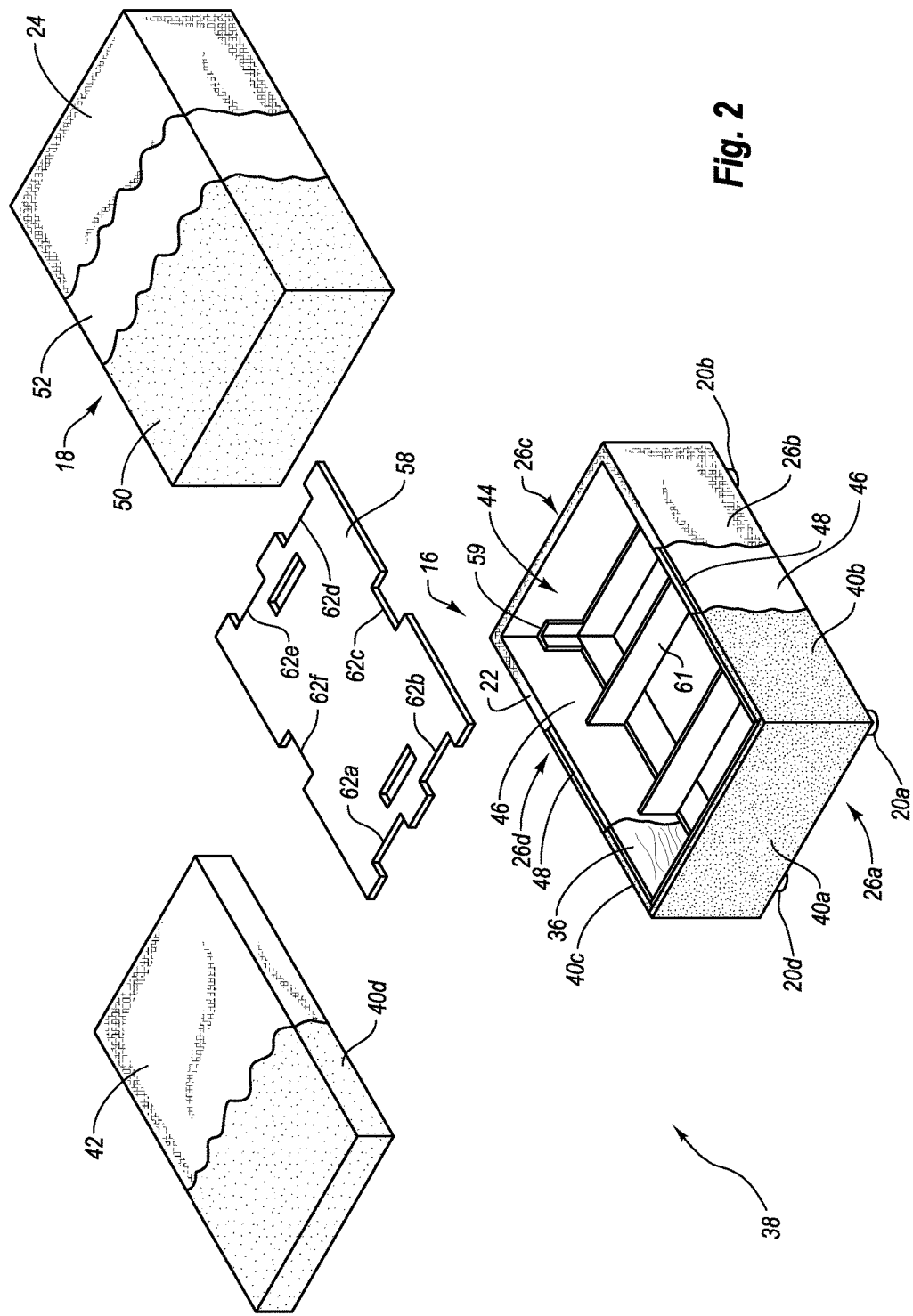
FIG. 2 is an exploded cutaway view illustrating the base.

FIG. 2 illustrates an exploded cutaway view of base 12. In the illustrated embodiment, frame assembly 16 comprises a frame 36 and a cushion assembly 38 associated with frame 36. Frame 36 is configured and arranged so as to support the weight of a consumer utilizing modular furniture assembly 10. Frame 36 can comprise a plurality of structural members made from wood, metal, composite, plastic, or any other structural material or combination thereof. As will be appreciated by one of ordinary skill in the art, the structural members that make up frame 36 and their orientation can be modified and/or rearranged to meet different specifications, such as size and/or weight requirements.

In the illustrated embodiment, frame assembly 16 further comprises a support member 58 that is mounted on frame 36. Support member 58 is positioned in a recess 44 of frame 36. For example, in one embodiment, support member 58 is mounted on four upstanding posts 59 and/or upstanding slats 61 positioned within recess 44. Support member 58 comprises a sheet of material, such as wood or some other structural material, having a plurality of grooves 62a-f formed therein. Grooves 62a-f are positioned along the perimeter of support member 58 and are sized so as to allow a portion of coupler 15 to be received therein. Grooves 62a-f are positioned in support member 58 so as to provide a variety of coupling locations on base 12 for the coupling of transverse member 14 to base 12 and/or coupling of base 12 to another base 12.

Figure 5B:
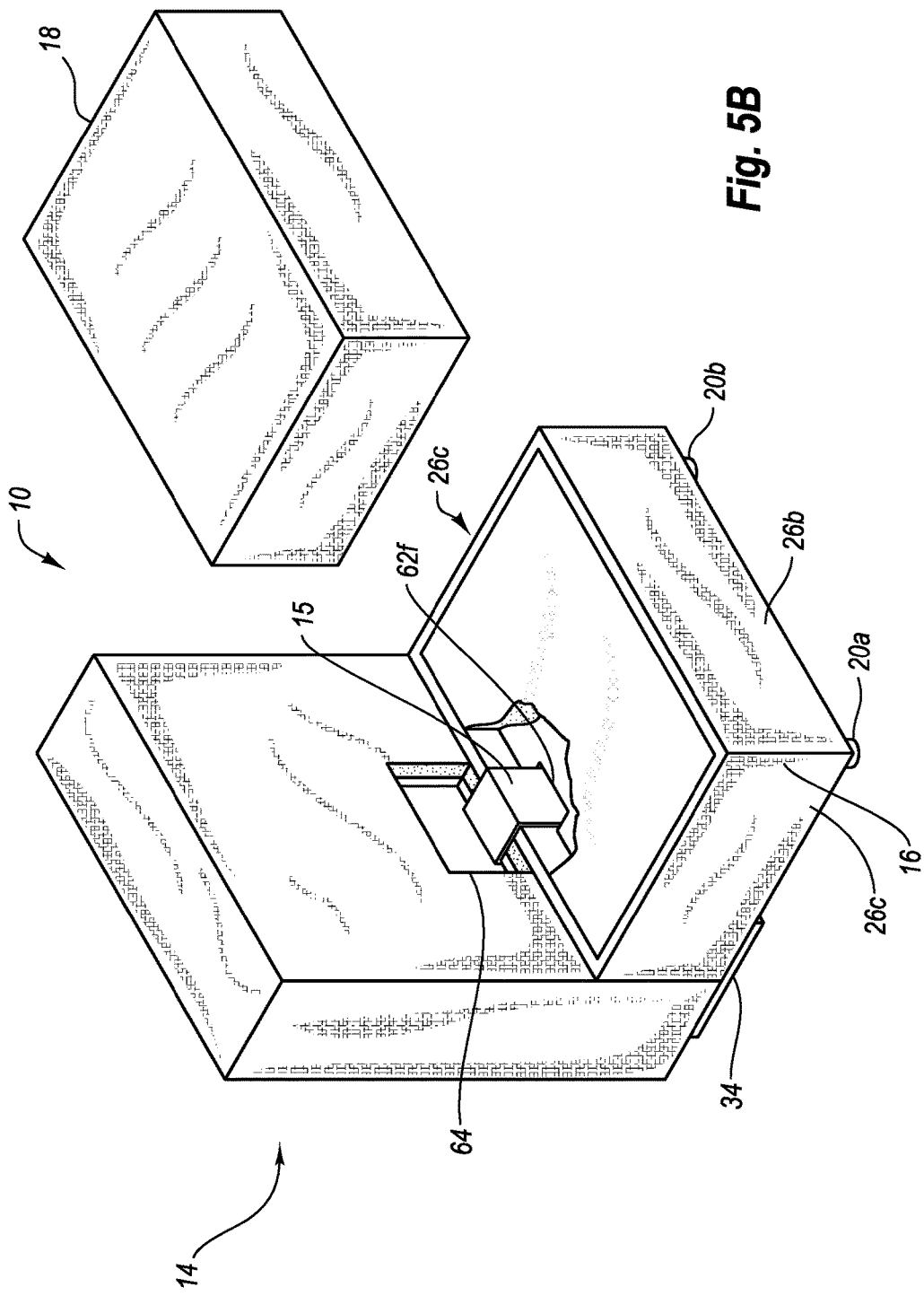
FIG. 5b is a perspective view illustrating the positioning of the coupler in relation to the transverse member and the base.

When support member 58 is positioned in recess 44 of frame 36, grooves 62a-f each form a portion of an aperture in frame assembly 16 (see FIG. 5b). In the illustrated embodiment, two grooves 62a-b,d-e are positioned adjacent respective abutting surfaces 26a,c, and one groove 62c,f is positioned adjacent respective abutting surfaces 26b,d. Two grooves 62a-b,d-e are respectively positioned adjacent respective abutting surfaces 26a,c in order to enable the positioning of transverse member 14 in two different locations adjacent each abutting surfaces 26a,c. The ability to position transverse member 14 in multiple locations adjacent base 12 enables the formation of different furniture configurations. As such, transverse member 14 can be positioned and coupled to base 12 by coupler 15 in at least six different positions in relation to base 12. This can be accomplished, for example, by aligning an aperture 64 (FIG. 3) of transverse member 14 with any of grooves 62a-f and placing a portion of coupler 15 in each of aperture 64 and the desired aperture of frame assembly 16.

Thus, the configuration and positioning of grooves 62a-f in support member 58 facilitates different positioning of transverse member 14 with respect to base 12, such that a variety of shapes and configurations of modular furniture assemblies can be made. For example, aperture 64 of transverse member 14 can be aligned with any of grooves 62a-f. Once aligned, coupler 15 (FIG. 4) can be used to connect base 12 to transverse member 14, as illustrated in FIG. 5b.

Figure 6J:
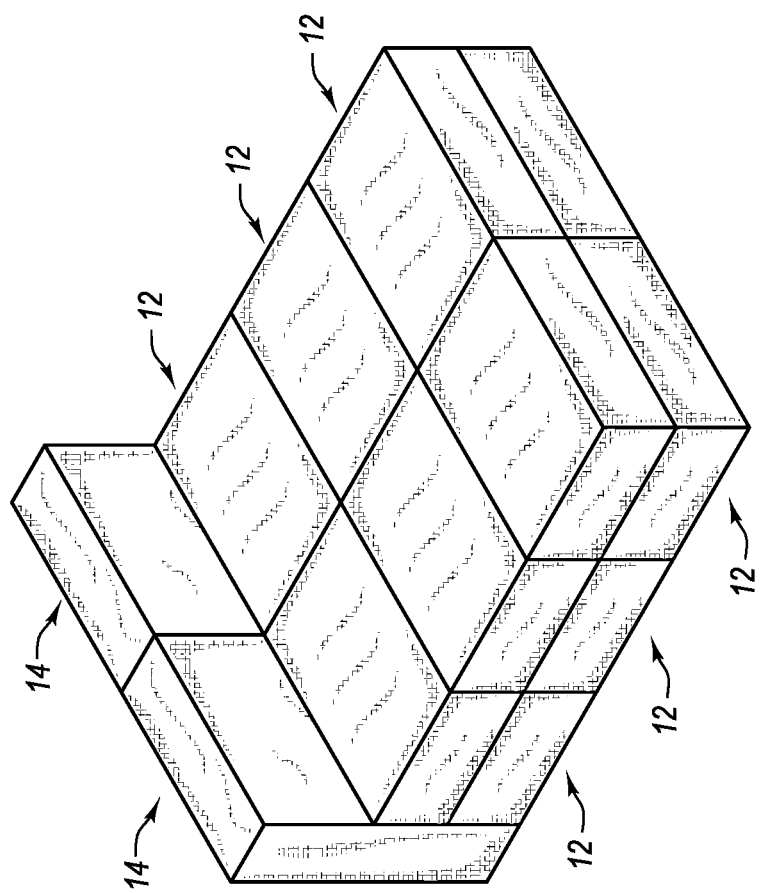
FIG. 6j illustrates a modular furniture assembly in the configuration of a bed.

Similarly, grooves 62c or 62f of a first base 12 can be aligned with either groove 62c or 62f of a second base 12 so as to couple two bases together, as illustrated in FIG. 6b. The versatility of being able to couple multiple bases 12 and transverse members 14 together enables the ability to make a variety of different and unique furniture assemblies. A first base 12 can be coupled to a second base 12 by aligning an aperture of the first base 12 with an aperture of the second base 12 and placing a portion of coupler 15 in the aperture of the first base 12 and the aperture of the second base 12. FIGS. 6a-6j illustrate various examples of furniture assemblies that can be formed from bases 12 and transverse members 14 by employing coupler 15 to couple the bases 12 to the transverse members 14 and/or bases 12 as shown therein.

Returning now to FIG. 2, cushion assembly 38 comprises a plurality of cushioning members 40a-c that connect to the outer surface of frame 36 and an additional cushioning member 40d that is mounted upon support member 58 when support member 58 is mounted within frame 36. Cushioning members 40a-c,d are configured to provide a cushioning surface for a consumer utilizing modular furniture assembly 10. Cushioning of frame 36 with cushioning assembly 38 provides for a more comfortable piece of furniture.

Cushioning members 40a-c each comprise a rectangular piece of foam adapted to be positioned on respective outside surfaces of frame 36 so as to cover the outside portions of frame 36. An additional rectangular piece of foam employed to cushion the frame surface adjacent abutment surface 26c is not shown in the illustration of FIG. 2. Such cushioning members 40a-c (including the additional piece adjacent abutment surface 26c) can comprise a variety of types of foam in order to accommodate the desired resilience and padding of frame assembly 16; such cushioning members 40a-c may comprise a single piece of foam or can comprise a combination of foam layers, such as a layer of memory foam positioned over a layer of polyurethane foam. In the illustrated embodiment, cushioning members 40a-c are covered by an inner liner 46.

In this embodiment, cushioning member 40d also comprises a piece of foam covered by a liner 42. Cushioning member 40d is configured to be positionable within recess 44 of frame 36 on top of support member 58. The foam piece of cushioning member 40d can comprise a single piece of polyurethane foam, or a combination of different types of foams. For example, cushioning member 40d can comprise a single piece of polyurethane foam and a similarly shaped piece of memory foam positioned on top of the single piece of polyurethane foam to form the cushioning member 40d. Cushioning member 40d is configured to facilitate a comfortable sitting surface for a consumer utilizing modular furniture assembly 10.

Liner 42 and inner liner 46 are configured to cover and provide protection for cushioning members 40a-d of frame assembly 16. Liner 42 and inner liner 46 can comprise a fabric material that is either water permeable or impermeable. An advantage of a water impermeable liner is that the liner will help protect frame 36 and cushioning members 40a-d in the event a liquid, such as a soda, is spilled on frame assembly 16.

Frame assembly 16 also includes removable outer liner 22. Removable outer liner 22 is configured to be utilized with frame assembly 16 in order to provide additional protection for frame 36 and cushioning members 40a-c, and for aesthetics. Removable outer liner 22 is mounted on inner liner 46 so as to cover exposed portions of inner liner 46 when cushion 24 is mounted thereon.

In the illustrated embodiment, outer liner 22 is detachably coupled to frame assembly 16 through the means of a removable securing mechanism 48, such as a hook and pile mechanism, e.g. VELCRO. In this manner, outer liner 22 can be selectively removed and laundered in the event that outer liner 22 becomes soiled and/or stained. The removable securing mechanism 48, e.g. VELCRO, also facilitates a consumer to easily, quickly and efficiently reattach outer liner 22 to inner liner 46 of frame assembly 16. In addition, the selective removability of outer liner 22 also facilitates a consumer being able to mix and match various styles, designs and configurations of outer liners of modular furniture assembly 10 to create a customized and unique modular furniture assembly according to their desires and taste.

As indicated previously, base 10 includes a plurality of abutting surfaces 26a-d. In the illustrated embodiment, abutting surfaces 26a-d are respective, substantially flat surfaces configured to be positioned adjacent and abut the substantially flat abutting surface 28 of transverse member 14. Abutting surface 28 of transverse member 14 is configured to correspond with at least one of abutting surfaces 26a-d of base 12 when base 12 is placed in an abutting relationship with transverse member 14. In this manner, coupler 15 can be utilized to couple transverse member 14 to base 12.

Cushion 18 is configured to be positioned and mounted on frame assembly 16 so as to form base 12. Cushion 18 is sized such that the perimeter of cushion 18 is substantially equal to the perimeter of frame assembly 16. In the illustrated embodiment, cushion 18 comprises a piece of foam 50 covered by an inner liner 52. Foam piece 50 comprises a single piece of foam having a sufficient resilience and appropriate properties so as to provide a comfortable sitting surface when a user sits on modular furniture assembly 10. However, foam piece 50 can comprise multiple types and configurations of foam pieces, such as a layer of polyurethane foam and a layer of memory foam mounted on the polyurethane foam layer.

As mentioned previously, inner liner 52 covers foam piece 50. Inner liner 52 can comprise a fabric material sufficient to substantially cover foam piece 50. Inner liner 52 can be made of substantially the same material as inner liner 46 and/or liner 42.

In the illustrated embodiment, inner liner 52 is covered by removable outer liner 24 so as to provide an aesthetically pleasing and comfortable cushioning surface for a user to sit upon. Removable outer liners 24, 22 can have similarities. Removable outer liners 22, 24 can comprise a variety of different materials and may be attached in a variety of ways. For example, removable outer liners 22, 24 can be made out of materials such as cotton, leather, micro-fiber, suede, or any other type of material that a consumer may wish to utilize.

Removable outer liners 22, 24 can be detachably coupled through the use of a removable securing mechanism, such as a hook and pile mechanism, e.g. VELCRO, one or more zippers, male and female snap members, hook and latch type fasteners, or any other type of securing means that will facilitate the outer liners 22, 24 being selectively removable. In this manner, a consumer has the option to mix and match varying types, styles and configurations of removable outer liners 22, 24 so as to form a customized furniture assembly according to their desire and tastes.

Figure 3:
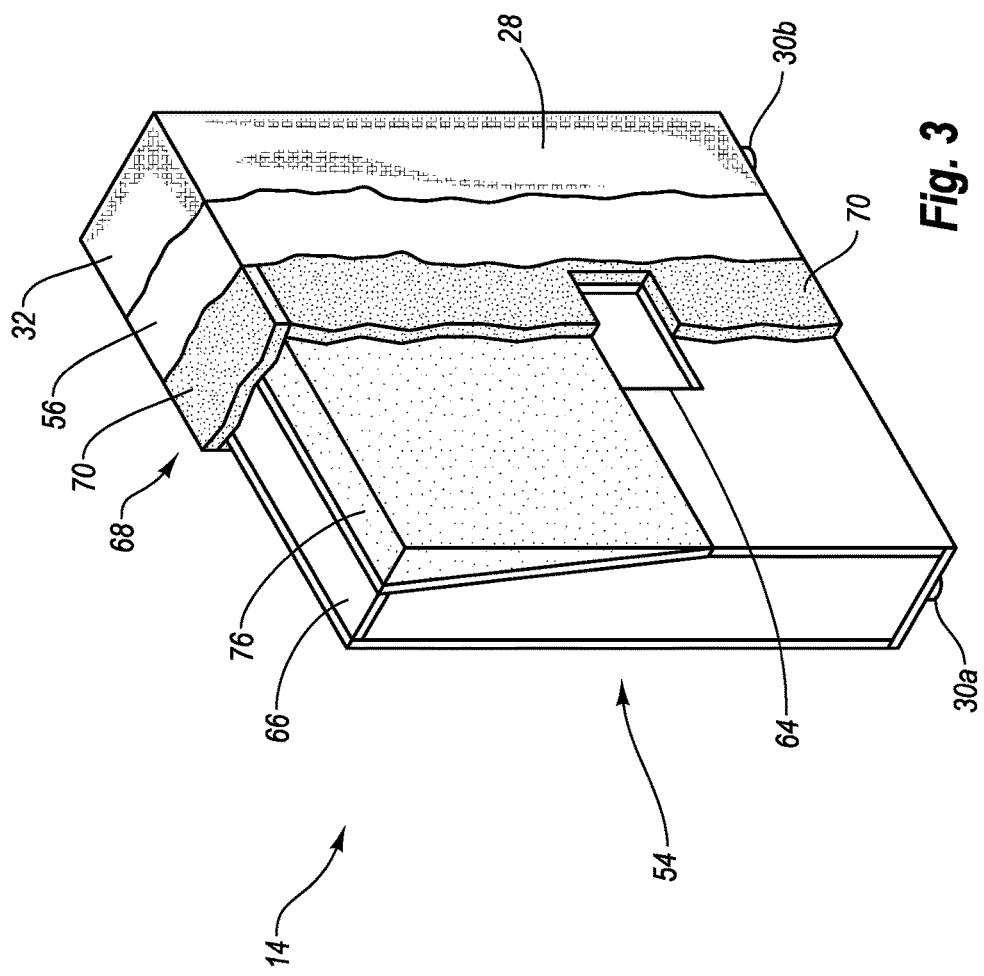
FIG. 3 is a perspective view of the traverse member.

FIG. 3 is a partial cut-away view illustrating traverse member 14. Traverse member 14 is configured to be coupled to base 12 so as to form modular furniture assembly 10. As further illustrated in FIG. 3, transverse member 14 is further configured to be positioned such that the longitudinal axis of transverse member 14 is substantially transverse to the plane of a support surface on which transverse member 14 is mounted, such as the ground or a floor.

In the illustrated embodiment, transverse member 14 comprises a frame assembly 54, an inner liner 56 covering frame assembly 54, removable outer liner 32, feet 30a-b coupled to the underside of frame assembly 54, and an aperture 64 formed in frame assembly 54 to facilitate coupling of transverse member 14 to base 12.

Frame assembly 54 is configured to provide lateral support to a user utilizing modular furniture assembly 10. Frame assembly 54 is further configured to provide a comfortable surface upon which a consumer can rest. In the illustrated embodiment, frame assembly 54 comprises a frame 66 and a cushion assembly 68. Frame 66 is configured to provide lateral support to a consumer sitting on modular furniture assembly 10 when transverse member 14 is coupled to base 12. Frame 66 can comprise a plurality of structural members made from wood, metal, composite, plastic, or any other structural material or combination thereof. As will be appreciated by one of ordinary skill in the art, the structural members that make up frame 66 and their orientation can be modified and/or rearranged to meet different specifications, such as size and/or weight requirements.

Cushion assembly 68 comprises a plurality of cushioning members 70 and a wedge 76 in association with frame 66 to provide padded and comfortable surfaces. In the illustrated embodiment, wedge 76 comprises a piece of foam shaped like a wedge. Wedge 76 is configured to be mounted on an angled front surface of frame 66 so as to form a rectangular solid with frame 66. Cushioning members 70 are configured to surround and cover frame 66 and wedge 76. Cushioning members 70 comprise a piece of foam sized sufficiently to cover both frame 66 and wedge 76. Covering cushion assembly 68 are inner liner 56 and removable outer liner 32. Inner liner 56 can have similar characteristics as inner liners 46, 52 and liner 42. Likewise, removable outer liner 32 can have similar characteristics as outer liners 22, 24.

Aperture 64 is configured and positioned to facilitate coupling of transverse member 14 to base 12. Aperture 64 is centrally positioned adjacent abutting surface 28 of transverse member 14 such that a variety of types and configurations of furniture assemblies can be formed. Aperture 64 is further positioned such that aperture 64 can be aligned with any of grooves 62a-f, such that transverse member 14 can be positioned, in relation to base 12, in a variety of ways. Aperture 64 extends through frame assembly 54 and inner and outer liners 56, 32. Aperture 64 is sized sufficiently to allow a portion of coupler 15 to be received therethrough.

Figure 5C:
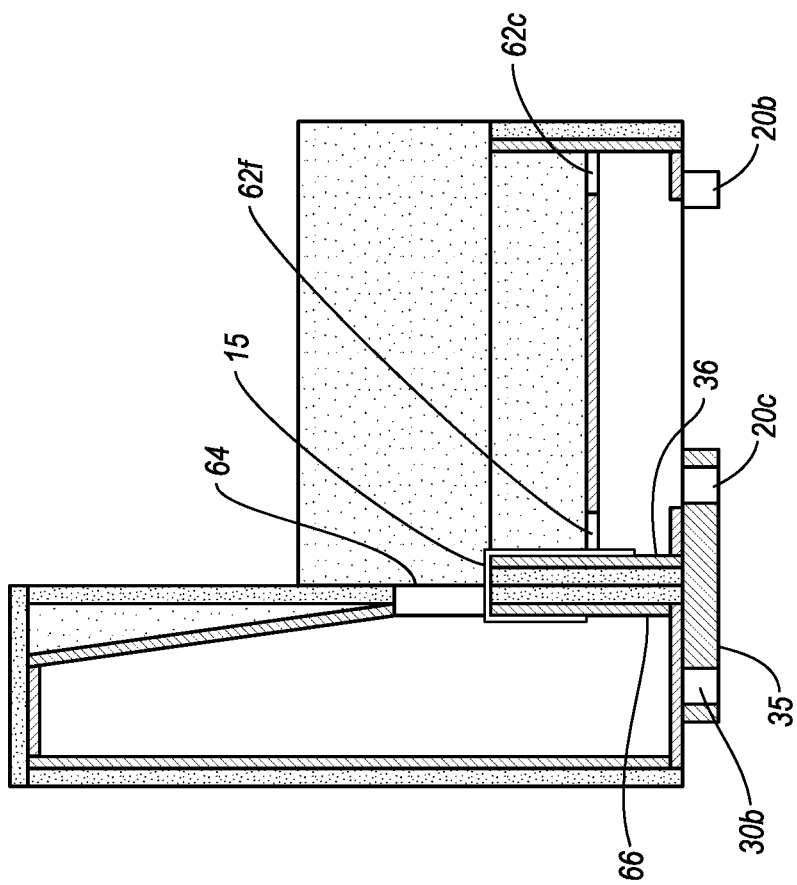
FIG. 5c is a cross-sectional view of the assembled modular furniture assembly.

FIG. 4 is a perspective view illustrating certain couplers, including coupler 15 and foot couplers 34, 34a. Coupler 15 is configured to detachably couple transverse member 14 to base 12. In the illustrated embodiment, coupler 15 comprises an elongate, U-shaped member configured to be positionable within aperture 64 of transverse member 14 and one of the grooves 62a-f of support member 58, or when two bases are to be coupled together, within one of the grooves 62a-f of the first base 12 and one of the grooves 62a-f of the second base 12. Coupler 15 is further configured to engage the inner surfaces of frame 36 of base 12 and frame 66 of transverse member 14, as shown in FIGS. 5b and 5c, so as to sandwich a portion of transverse member 14 and a portion of base 12 together between portions of coupler 15. Coupler 15 is configured to substantially prevent movement of the upper portion of transverse member 14 in relation to base 12. In this manner, coupler 15 substantially prevents movement of transverse member 14 in at least a first direction with respect to base 12.

Coupler 15 can be made from a metal material, or some other structural material. Coupler 15 can include an aperture on the top surface of coupler 15 in order to facilitate the ease of insertion and removal of coupler 15. Coupler 15 has a first leg 15a coupled to a body portion 15b having a second leg 15c coupled thereto. In one embodiment, first leg 15a is longer than second leg 15c in order to facilitate convenient coupling of base 12 to transverse member 14 and to resist forces induced on coupler 15. In another embodiment, first leg 15a is substantially the same length as second leg 15c.

Coupler 15 and foot couplers 34, 34a can be used to facilitate the detachable coupling of transverse member 14 to base 12. In the illustrated embodiment, foot coupler 34 comprises a block having a plurality of apertures 74a-b formed there through. Apertures 74a-b are sized and configured to receive a foot of base 12 or transverse member 14 therein. Apertures 74a-b of foot coupler 34 are sufficiently spaced apart, such that when a foot 30 from transverse member 14 is positioned in aperture 74a and a foot 20 from base 12 is positioned in aperture 74b, transverse member 14 and base 12 are adjacent and in contact one with another.

Foot couplers 34-35 are configured to substantially prevent movement of the bottom portion of transverse member 14 in relation to base 12. In this manner, foot couplers 34-35 substantially prevent movement of transverse member 14 in at least a second direction with respect to base 12. For example, in the embodiment illustrated in FIGS. 5a-c, coupler 15 substantially prevents movement of the top portion of transverse member 14 in at least a first direction, i.e., away from base 12, while foot couplers 34-35 substantially prevent movement of the top portion of transverse member 14 in at least a second direction, i.e., towards base 12.

Yet another embodiment of a foot coupler 34a is shown in FIG. 4. Foot coupler 34a can function similarly to foot coupler 34. Foot coupler 34a can replace foot coupler 34, and has additional apertures for connecting additional feet. Thus, foot coupler 34a is configured to substantially prevent movement of the bottom portion of transverse member 14 in relation to base 12.

Foot coupler 34a has four apertures 74a-d, enabling foot coupler 34a to be utilized in connection with coupling a base 12 to multiple transverse members 14 and/or bases 12 to form a furniture assembly as shown in FIGS. 6c-6j. For example, in the embodiment of FIG. 6c, one foot coupler 34a may be employed to couple together one leg of base 12 to one leg of a first transverse member 14, which is positioned as a backrest, and one leg of a second transverse member 14, which is positioned as an armrest, while another foot coupler 34a may be employed to couple together a second leg of base 12 to a second leg of the first transverse member 14 and a leg of a third transverse member 14, which is positioned as another armrest. In this example, one aperture of each foot coupler 34a is not utilized, but the symmetrical configuration of foot coupler 34a enables the consumer to employ foot coupler 34a in a variety of different configurations of furniture assemblies.

As will be appreciated by one of ordinary skill in the art, the foot coupler of the present invention does not need to be restricted as to the number of apertures 74 formed therein. For example, a foot coupler of the present invention can be sized and configured to include an appropriate number of apertures so as to couple the feet of two bases 12 and four transverse members 14 to facilitate the formation of a sofa. Optionally, a foot coupler can have any number of apertures necessary to couple a foot 20 of base 12 to a foot 30 of transverse member 14 or foot 20 of another base 12, and/or to couple a respective foot 20 of multiple bases 12 to a respective foot 30 of multiple transverse members 14, in any configuration. In one embodiment, apertures 74 can comprise a tapered opening so as to enable a consumer to more easily insert a foot therein.

FIGS. 5a-c illustrate how modular furniture assembly 10 is assembled. Illustrated in this embodiment, frame assembly 16 of base 12 is positioned against transverse member 14, such that aperture 64 is adjacent to and aligned with groove 62f in support member 58. Once aligned, coupler 15 is positioned within aperture 64 of transverse member 14 and pushed downward by the consumer so as to engage the inner flat surface of frame 66 of transverse member 14 and the inner flat surface of frame 36 of base 12, as shown in FIGS. 5b and 5c. In this manner, coupler 15 is connected to base 12 and transverse member 14.

In addition, foot 20d of base 12 is received into aperture 74b of foot coupler 34, and foot 30a of transverse member 14 is received into aperture 74a of foot coupler 34. Similarly, foot coupler 35, which may be similar or identical to foot coupler 34, is utilized in a similar manner as foot coupler 34, wherein foot 20c is received into aperture 74b of foot coupler 35 and foot 30b is received into aperture 74a of foot coupler 35. As such, utilization of coupler 15 and foot couplers 34-35 serve to detachably couple transverse member 14 to base 12 to form furniture assembly 10 of the present invention.

As will be appreciated by one of ordinary skill in the art, the consumer can easily and quickly use coupler 15 and foot couplers 34, 34a and/or 35 to manually, detachably couple base 12 to transverse member 14 and/or another base 12. For instance, the consumer does not require tools to connect or disconnect coupler 15 to base 12 and transverse member 14. Since no tools are required, the consumer can manually connect or disconnect coupler 15 and foot couplers 34, 34a, 35 as the case may be, to/from base 12 and transverse member 14 and/or another base 12. Thus, as used herein, the phrase "manually, detachably couple" can mean that coupler and foot couplers conveniently couple and decouple base 12 and transverse member 14 and/or another base 12 without using a tool, such as a hammer or screwdriver, or some other mechanized machine.

Once coupler 15 is connected to base 12 and transverse member 14, cushion 18 can be placed on frame assembly 16 so as to form furniture assembly 10. As will be appreciated by one who is skilled in the art, foot couplers 34, 34a and coupler 15 are easily, manually disconnected and removed in order to disassemble modular furniture assembly 10.

FIG. 5b is a perspective view of modular furniture assembly 10 illustrating coupler 15 detachably coupling transverse member 14 to base 12. In this illustration, coupler 15 is received through aperture 64 of transverse member 14 and an aperture in base 12. The aperture in base 12 through which coupler 15 is received is formed by groove 62f and frame 36. In this manner, coupler 15 is utilized to facilitate the coupling of transverse member 14 to base 12. In addition, foot coupler 34 is mounted on feet 20d and 30a, and foot coupler 35 is mounted on feet 20c and 30b.

FIG. 5c illustrates a cross-sectional view of modular furniture assembly 10 when coupler 15 and foot couplers 34-35 are connected to base 12 and transverse member 14. As shown in the illustrated embodiment, coupler 15 sandwiches substantially flat portions of frame 36 and substantially flat portions of frame 66 when coupler 15 is connected to base 12 and transverse member 14. Coupler 15 is received in aperture 64 and groove 62f when connected to base 12 and transverse member 14. Foot coupler 35 is also illustrated showing how a foot 30b of transverse member 14 and a foot 20c of base 12 are received in foot coupler 35.

Modular furniture assembly 10 can be assembled and disassembled in a quick and efficient manner utilizing base 12, transverse member 14, coupler 15 and foot couplers 34-35. Similarly, the ease of removing coupler 15 and foot couplers 34-35 allows a consumer to easily dismantle or disassemble modular furniture assembly 10 for moving and/or packing of modular furniture assembly 10.

For example, a consumer could purchase a base 12, a transverse member 14, a coupler 15, and multiple foot couplers 34-35 and thereafter assemble them to form a modular furniture assembly having a back and a base, such as a chair. The consumer could easily assemble the modular furniture assembly by positioning the base 12 adjacent the transverse member 14, inserting the coupler 15 to engage the frame of the transverse member 14 and frame of the base 12, and then position foot couplers 34-35 over the feet of opposing sides of the base 12 and the transverse member 14 to form a secure and comfortable chair, such as shown in FIG. 1. In the event that the consumer needs to move the chair, the chair is easily disassembled by removing the coupler and the foot couplers, and thereby creating two separate pieces that can be easily moved and reassembled to form the furniture assembly.

The same advantages that extend to a consumer in relation to moving the furniture assembly also extend to shipping and packaging. For instance, the manufacturer of the modular furniture assembly can package the transverse member separate and apart from the base. The rectangular uniform shape of the transverse member and the base allow easy packaging and shipping of the transverse member and the base. By employing a base 12 and transverse member 14, the manufacturer and/or retailer can make, store and ship a vast number of two types of furniture pieces, thereby making the manufacturing, shipping and storing processes highly efficient. In addition, if the feet are screwed on to the transverse member and the base, the feet can be easily removed and reattached to the transverse member and the base to facilitate in the shipping and uniformity of the shape of the transverse member and the base.

FIGS. 6a through 6j illustrate different configurations of furniture assemblies utilizing bases 12 and transverse members 14, as the case may be, according to the present invention. In one embodiment, each of the bases 12 shown in FIGS. 6a-6j have substantially the same dimensions as each of the other bases 12 shown therein, such that the bases 12 are interchangeable, and each of the transverse members 14 shown in FIGS. 6a-j have substantially the same dimensions as each of the other transverse members 14, such that the transverse members 14 are interchangeable.

FIG. 6a illustrates the use of a base 12 alone, by itself, to form an ottoman. FIG. 6b illustrates the configuration of a bench, wherein two bases 12 are utilized and coupled together to form the bench. FIG. 6c illustrates the configuration of an arm chair. In this embodiment, three transverse members 14 are utilized in connection with one base 12 so as to form the chair. FIG. 6d illustrates the configuration of a chaise formed by two bases 12 and two transverse members 14 coupled together.

An appropriate number of couplers 15 can be used for each of the furniture configurations illustrated in FIGS. 6a-j. For example, a single coupler 15 can be employed to couple base 12 to base 12 to form the bench of FIG. 6b. Alternatively, first and second couplers 15 are employed to couple base 12 to base 12 to form the bench of FIG. 6b. First, second and third couplers 15 are employed to couple respective transverse members 14 to base 12 to form the chair of FIG. 6c. In one embodiment, a single coupler 15 is employed to couple base 12 to base 12 in the chaise of FIG. 6d, and second and third couplers 15 are used to couple respective transverse members 14 to one of the bases 12. The assemblies shown in FIGS. 6e-6j can similarly be coupled together through the use of couplers, such as coupler 15 to couple respective bases 12 and transverse members 14 together to form a desired configuration.

FIG. 6e illustrates a sofa formed from two bases 12 and four transverse members 14. FIG. 6f illustrates a deep love seat, utilizing two bases 12 and four transverse members 14 detachably coupled together. FIG. 6g illustrates the configuration of a sectional having six bases 12 and seven transverse members 14 coupled thereto. FIG. 6h illustrates a configuration of a twister design, utilizing four bases 12 and four transverse members 14. FIG. 6i illustrates the configuration of a playpen, utilizing four bases 12 and eight transverse members 14 detachably coupled to form the playpen, as illustrated in FIG. 6i. FIG. 6j illustrates the configuration of a bed, wherein six bases 12 are coupled together to form the bed and two transverse members 14 are coupled to two of the bases 12 to form the headboard of the bed. In this manner, the six bases 12 are configured and arranged so as to enable a user to sleep thereon. In one embodiment, a coupler 15 is employed to form a connection between each base 12 and transverse member 14 and/or other base 12 in the embodiments shown in FIGS. 6a-6j.

FIG. 7 illustrates an alternative embodiment of base 112. In the illustrated embodiment, frame 136 is configured such that support member 158 is angled. Angling of support member 158 allows a user to naturally recline while sitting on base 112. In this embodiment, cushioning member 140e is a wedge shaped piece of foam configured to be received within recess 144 of frame assembly 116 to form a flush top surface.

In the illustrated embodiment, cushion 118 comprises multiple foam pieces to form a cushion that will facilitate the reclining of a user sitting thereon. For example, cushion 118 can comprise a first foam wedge piece 120 and a second foam wedge piece 122 positioned adjacent to first foam wedge piece 120 to form a rectangular solid. A layer of memory foam 124 can be positioned on second foam wedge 122 so as to form a cushion 118 a user can sit upon. As will be appreciated by one of ordinary skill in the art, the layer of memory foam 124 provides additional comfort to a user sitting on base 112. First foam piece 120 can be denser than second foam piece 122 so as to allow second foam piece 122 to give more when pressure is applied thereon, such as when a user is sitting on cushion 118. The discrepancy in density of the two foam wedges 120,122 provides for the natural reclining of a consumer when the consumer sits on cushion 118.

Figure 8:
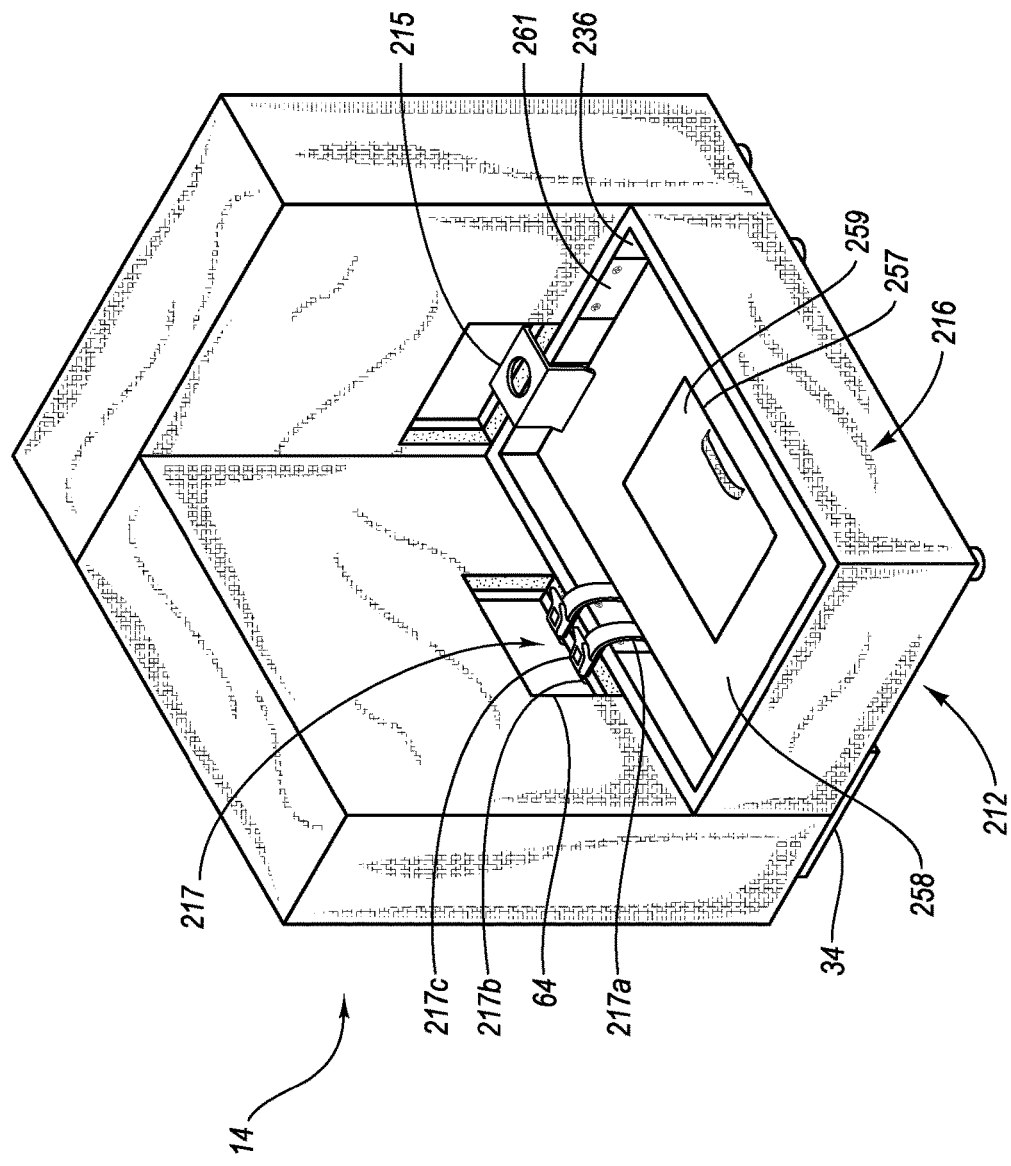
FIG. 8 illustrates another embodiment of the base and coupler.

FIG. 8 illustrates another embodiment of the base and various couplers. In this embodiment, base 212 comprises a frame assembly 216 having a frame 236 and a plurality of mounting plates 261 mounted on frame 236. Frame 236 comprises a support member 258 upon which a cushion or cushioning member can be mounted. Support member 258 comprises a solid, substantially flat surface. In this embodiment, support member 258 does not comprise grooves. When coupler 15 is utilized with base 212, first end 15a of coupler 15 can be shortened so as to not interfere with support member 258. As will be appreciated by one of ordinary skill in the art, base 12 and base 212 can be employed in the same furniture assembly.

Mounting plates 261 are reinforced, substantially flat surfaces configured and positioned to enable the convenient, manual, detachable coupling of base 212 to transverse member 14 by coupler 15, a flared coupler 215, and/or a ratcheting coupler 217. Mounting plates 261 are positioned along the periphery of frame 236 in a similar fashion as grooves 62a-f are positioned in relation to base 12. The respective positioning of mounting plates 261 along the periphery of base 212 enables the quick and efficient positioning of transverse member 14 in relation to base 212 so as to form a desired furniture assembly. Mounting plates 261 are mounted on the inner surface of frame 236 and/or on the transverse member 14.

Flared coupler 215 comprises a U-shaped member having terminating, flared ends that curve outwardly with respect to each other. The flared ends are curved so as to facilitate the insertion of coupler 215 into transverse member 14 and base 212. Flared coupler 215 can be utilized in the same or similar fashion as coupler 15 to manually, detachably couple base 212 to transverse member 14 and/or another base 212, such as shown in FIGS. 6b-6j. The lengths of the legs of flared coupler 215 may be substantially the same, for example, or may be different.

In the illustrated embodiment, ratcheting coupler 217 comprises a first portion 217a, a second portion 217b and a ratcheting portion 217c configured to enable the manual, detachable coupling of base 212 to transverse member 14. First portion 217a is configured to be selectively received within and secured by ratcheting portion 217c. Ratcheting portion 217c is coupled to second portion 217b and configured to selectively receive and secure first portion 217a therein. Ratcheting portion 217c is further configured to advance first portion 217a within ratcheting portion 217c as ratcheting portion 217c is actuated. Ratcheting portion 217c is further configured to selectively release first portion 217a therefrom to enable a consumer to quickly and efficiently detach first portion 217a from second portion 217b.

In the illustrated embodiment, first portion 217a is coupled to base 212 and second portion 217b is coupled to transverse member 14. For example, first portion 217a can be selectively coupled to any mounting plate 261. First portion 217a is secured to second portion 217b so as to manually, detachably couple base 212 to transverse member 14. Ratcheting coupler 217 can be utilized with base 12.

A useful example of a type of ratcheting coupler 217 is the coupler commonly utilized in connection with snowboard bindings. The ratcheting coupler commonly employed with snowboard bindings includes a first strap having a plurality of grooves formed perpendicular to the length of the strap, and an associated second strap having a ratcheting type mechanism coupled thereto. The first strap can be received within and secured by the ratcheting mechanism. The ratcheting mechanism includes a lever that when grasped and actuated will advance the first strap within the ratcheting mechanism by contact with the grooves in the first strap. Typically, a means is provided for releasing the first strap from the ratcheting mechanism, such as a button or an additional lever, such that actuation of the button or lever enables a consumer to easily remove the first strap from the ratcheting mechanism. As such, the first strap is secured to the second strap.

A storage compartment 257 can be utilized in connection with frame 236 to store couplers or other items, as the consumer so chooses. Storage compartment 257 can be sized and configured to accommodate numerous and various couplers therein. Storage compartment 257 can be closed off by the use of a trapped door 259 formed in support member 258. Storage compartment 257 provides a useful and convenient storage area in which to store some of the consumer's items and/or hardware associated with the furniture assembly.

Coupler 15, flared coupler 215, leg couplers 34-35 and ratcheting coupler 217 are examples of couplers that manually, detachably couple a base 212 (or 12) to transverse member 14 and/or another base 212 (or 12). As will be appreciated by one having ordinary skill in the art, a variety of types and configurations of couplers that manually, detachably couple can be utilized without departing from the spirit and scope of the present invention. For example, in one embodiment, the coupler could be a mechanical hook and latch system. In another embodiment, the coupler can be a clasp, such as a clasp used on watches. In yet another embodiment, the coupler can be a variety of different types of quick release systems. In yet another embodiment, the coupler can comprise a plurality of magnets. In yet another embodiment, the coupler can comprise snaps. In another embodiment, the coupler can be a strap and buckle configuration. In one such embodiment, one end of a first strap is coupled to transverse member 14 and the other end of the first strap has a female portion of a buckle coupled thereto. One end of the second strap is coupled to base 12 and the other end is slidably received within the male portion of the buckle, such that when the male portion is received within the female portion, the second strap can be pulled to cinch the pieces together.

In yet another embodiment of the present invention, multiple configurations of transverse members may be employed to achieve unique, novel, and useful furniture configurations.

Figure 9A:
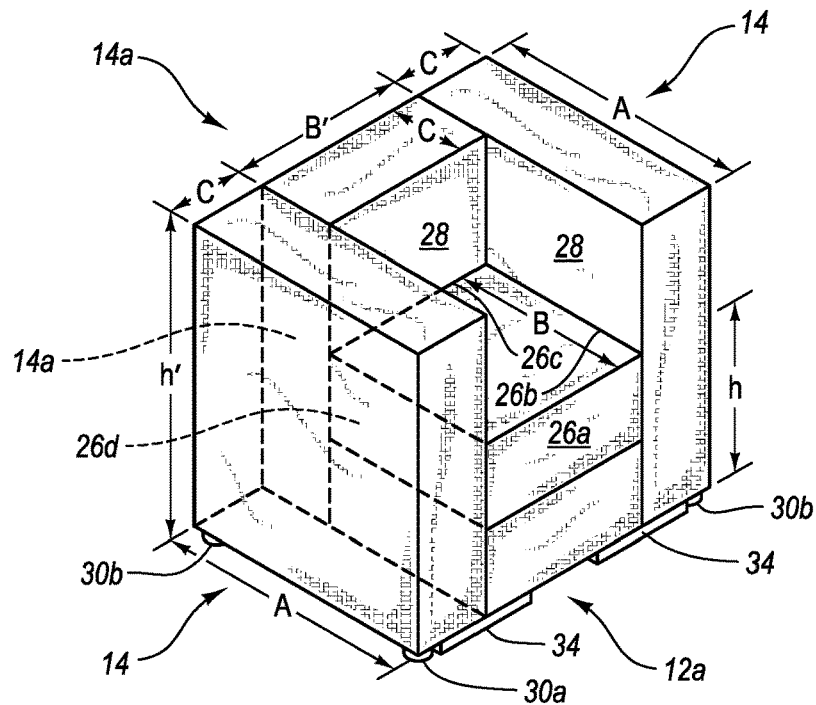
FIGS. 9A and 9B illustrate configurations for a modular furniture assembly having transverse members of different dimensions.
Figure 9B:
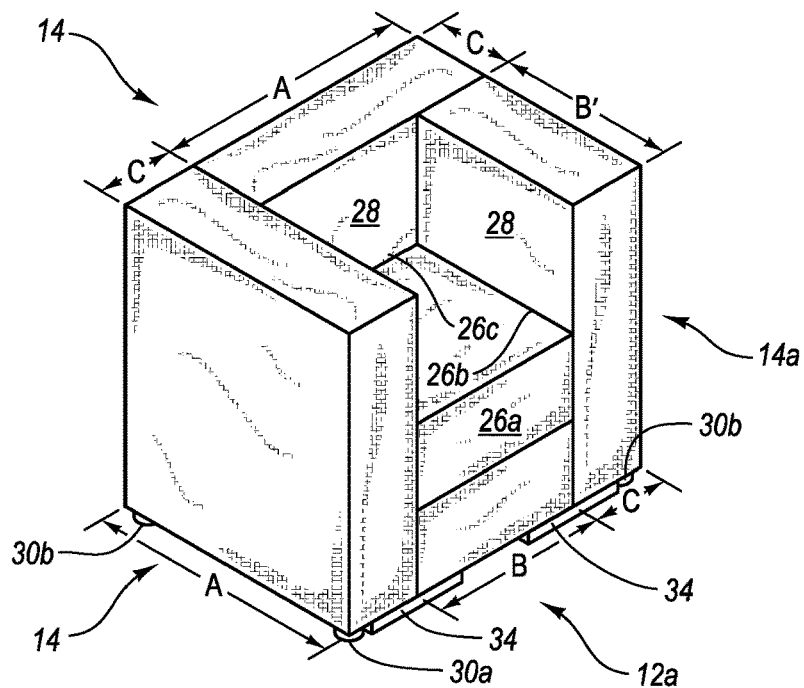

Referring to FIGS. 9A and 9B, one or more bases 12a and one or more transverse members 14, 14a may be combined in various configurations facilitated by the spatial relationships between the bases 12a and transverse members 14, 14a. The embodiments of FIGS. 9A and 9B include one or more bases 12a and transverse members 14, 14a having a rectangular shape in a plane parallel to a support surface upon which the transverse members 14, 14a and base 12a rest when assembled.

In one embodiment, base 12a of FIGS. 9A and 9B has the same attributes, dimensions, and configuration as base 12 as described in any of FIGS. 1 through 8 and the discussion relating thereto, except that base 12a has a square shape, rather than being rectangular with unequal sides. Similarly, in one embodiment, transverse member 14a of FIGS. 9A, 9B, and 10 has the same attributes, dimensions, and configuration as the transverse member 14 as described in any of FIGS. 1 through 8 and the description relating thereto, except that length (B) of transverse member 14a is shorter than length (A) of transverse member 14. Transverse member 14 of FIGS. 9A, 9B, and 10 may have the same attributes, dimensions, and configuration as the transverse member 14 of FIGS. 1 through 8 and the description relating thereto.

For example, the embodiment of FIGS. 9A and 9B includes transverse members 14 and at least one transverse member 14a. The transverse members 14 and 14a each include a surface 28 for abutting against one of the surfaces 26a-26d of the base 12a. The surfaces 28 and 26a-26d may be perpendicular to a support surface upon which the transverse members 14, 14a and base 12a rest when assembled.

Two or more of the sides 26a-26d of the base 12a have a length of (B) in a plane parallel to a support surface upon which the transverse members 14, 14a and base 12a rest when assembled. The base 12a has a height (h) perpendicular to the support surface upon which the transverse members 14, 14a and base 12a rest when assembled.

The surfaces 28 of the transverse members 14 have a length (A) in a plane parallel to a support surface upon which the transverse members 14, 14a and base 12a rest when assembled. The surface 28 of the at least one transverse member 14a have a length (B') in a plane parallel to a support surface upon which the transverse members 14 and base 12a rest when assembled. In one embodiment (B') is substantially equal to (B). For example, (B') may have the same length as (B). The transverse members 14, 14a have a width (C) perpendicular to the surface 28, such as along sides perpendicular to the surface 28. The transverse members 14, 14a have a height (h') perpendicular to the support surface upon which the transverse members 14 and base 12a rest when assembled. The height (h') is typically substantially greater than, e.g., at least more than 1.2 times, the height (h).

In one embodiment, the length (A) is substantially equal to the sum of (B) and (C) such that base 12a, transverse members 14, and the one or more transverse members 14a may be removably coupled to one another using any of the couplers described herein in a variety of configurations. For example, the couplers described in FIGS. 1 through 8 and/or FIGS. 11 and 12 and the description related thereto may be employed to connect the bases 12, 12a and transverse members 14, 14a of FIGS. 9A, 9B, and 10.

As shown in FIG. 9A, in one configuration the transverse member 14a forms a seat back, whereas the transverse members 14 form the sides. In the configuration of FIG. 9A, the transverse members 14 contact both the base 12a and the transverse member 14a such that the outermost surfaces of the assembled members form a rectangle. As shown in FIG. 9B, in another configuration, the transverse member 14a forms one of the sides and one of the transverse members 14 forms a side. The other transverse member 14 forms the seat back such that the surface 28 thereof engages both the transverse member 14a and the surface 26c of the base 12a. In the embodiment of FIG. 9B, a first of the transverse members 14 contacts both the base 12a and the transverse member 14a. The second of the transverse members 14 contacts both the base 12a and the first transverse member 14. Additional bases 12a with additional transverse members 14, 14a enable still other configurations.

Figure 10:
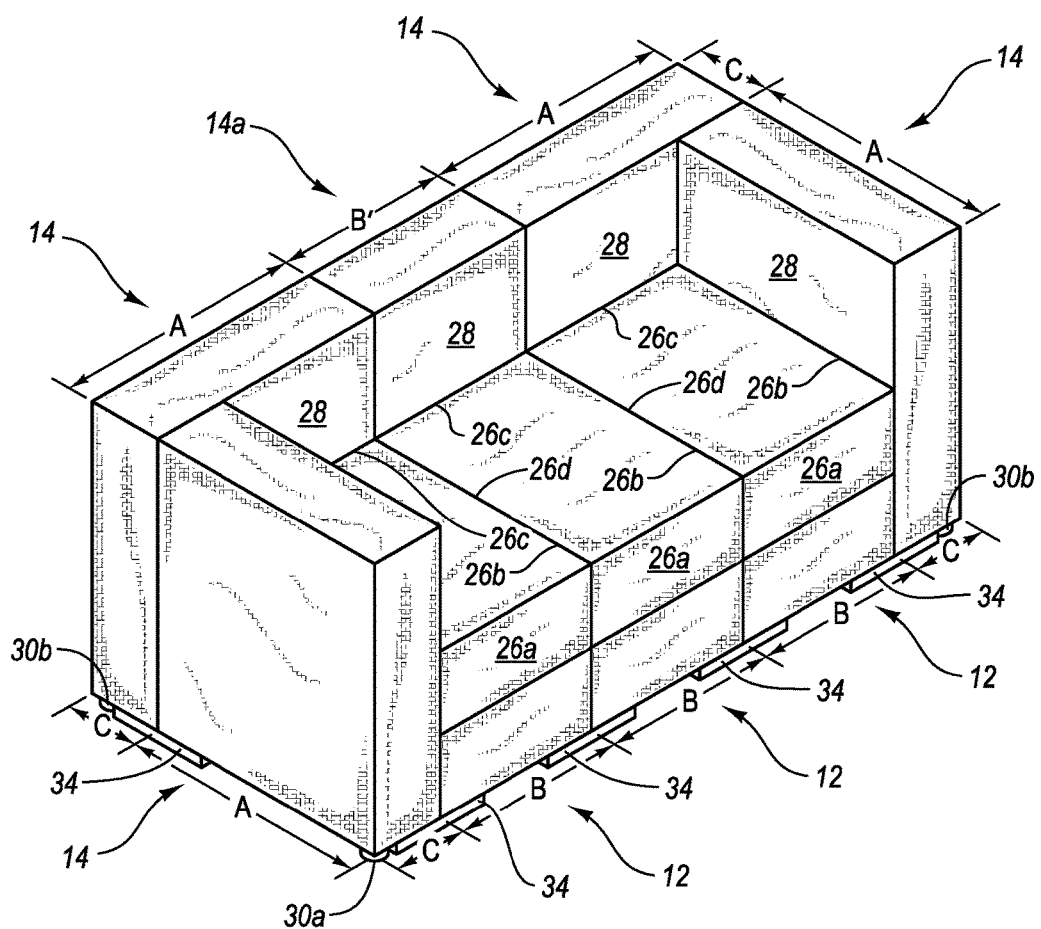
FIG. 10 illustrates a configuration for a modular furniture assembly including multiple bases and transverse members having different dimensions.
Figure 12:
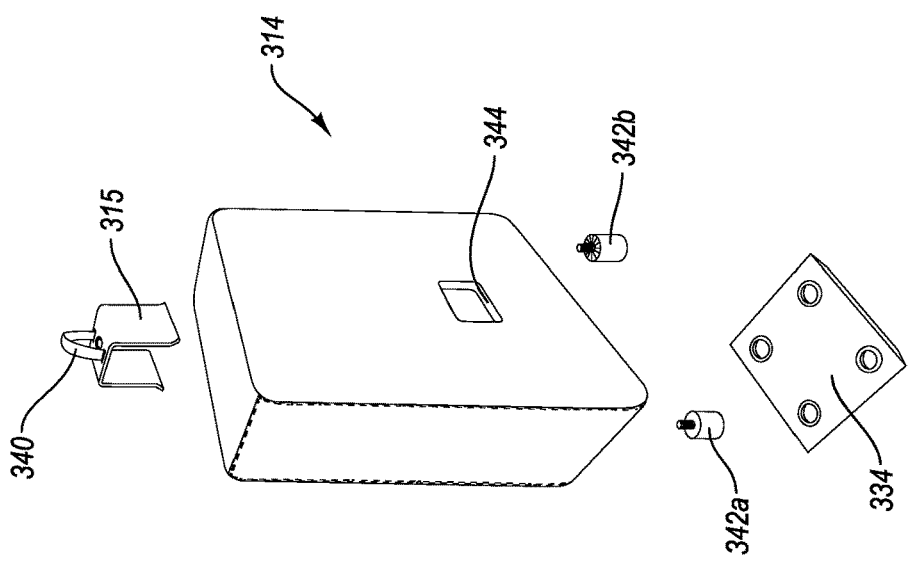
FIG. 12 illustrates another embodiment of a transverse member that can be used according to the various embodiments of the present invention.
Figure 11:
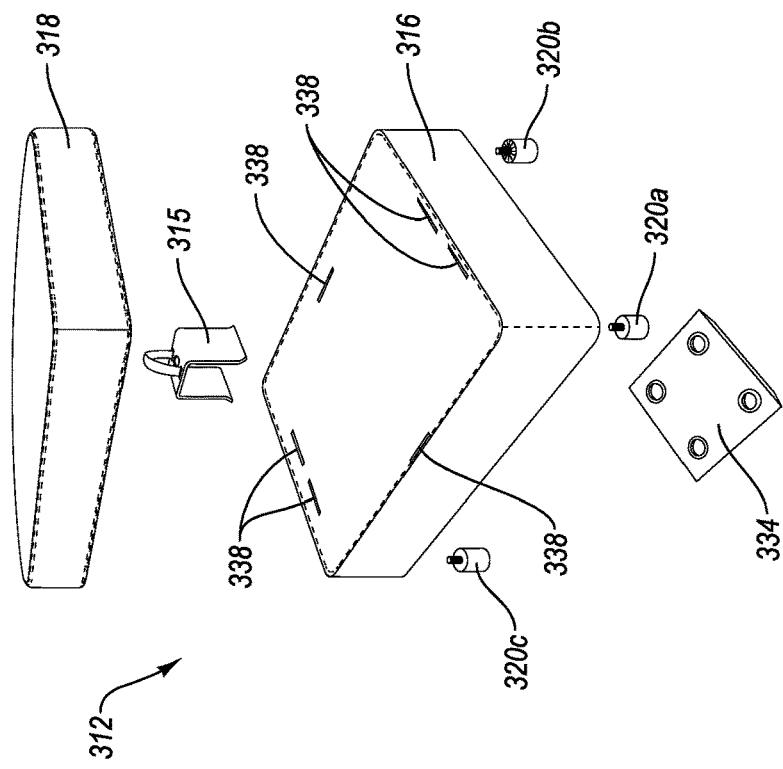
FIG. 11 illustrates another embodiment of a base and coupler that can be used according to the various embodiments of the present invention.

The transverse members 14, 14a and bases 12, 12a of FIGS. 9A, 9B, and 10 may be removably coupled to each other using the couplers of FIGS. 1 through 8 and/or FIGS. 11 and 12. Thus, as shown in FIGS. 9A and 9B, transverse members 14, 14a and base 12a and the couplers of FIGS. 1 through 8 and FIGS. 11 and 12 may be employed to create a chair having the configuration of FIG. 9A or FIG. 9B, such that multiple configurations may be achieved.

In yet another alternative embodiment, a square shaped base 12a may be removably coupled to two or three transverse members 14a to form a unique chair configuration.

FIG. 10, illustrates an example of a configuration using additional bases 12 and transverse members 14. The bases 12 of FIG. 10 may be the same as the bases 12 of FIGS. 1 through 8, for example. In the embodiment of FIG. 10, the bases 12 have a length equal to (A) along sides 26b, 26d and a width equal to (B) along sides 26a and 26c perpendicular to sides 26b, 26d.

In the embodiment of FIG. 10, the bases 12 may be removably coupled to one another in a collinear fashion. For example the bases 12 may be removably coupled to one another such that they form an overall rectangle of length (N*B) and width (A), where (N) is the number of bases 12. This may be accomplished by securing the side 26b of a base 12 to the side 26d of an adjacent base 12.

As shown in FIG. 10, two transverse members 14 and at least one transverse member 14a secure to the bases 12 in order to form a back for a sofa configuration. The transverse member 14a is disposed between the transverse members 14, such that the transverse members 14, 14a are collinear. Alternatively, the transverse member 14a may be positioned to one side of the two transverse members 14 that form the seat back. In FIG. 10, the combined transverse members 14, 14a may form a rectangle of length (N*B+2C), where (N) is the number of bases 12 arranged in a collinear fashion. The overall shape of the sofa configuration may be a rectangle of length (N*B+2C) and width (A+C). Each of the transverse members 14, 14a may directly, removably couple to one of the bases 12. In an alternative embodiment, the transverse members 14, 14a are selectively coupled to each other.

Additional transverse members 14 form sides of the sofa configuration of FIG. 10 by coupling to the end bases 12 of the row of bases 12. Thus the surfaces 28 of the transverse members 14 forming the sides of the sofa of FIG. 10 are perpendicular to the surfaces 28 of the transverse members 14 and at least one transverse member 14a, which form the back of the sofa.

As in other embodiments described herein, additional bases 12 and transverse members 14, 14a may couple to the configuration illustrated. Furthermore, the illustrated bases 12 and transverse members 14, 14a may be rearranged in other configurations. Bases 12 and transverse members 14, 14a having other shapes may also removably couple to the illustrated bases 12 and transverse members 14, 14a. For example, a wedge or "pie piece" shaped base may be employed in conjunction with one or more bases 12 (and/or 12a) and one or more transverse members 14 (and/or 14a) to form a curved sofa, e.g. a semicircular or otherwise curved shaped sofa.

The couplers (e.g., foot couplers and U-shaped couplers) and methods of coupling discussed with respect to FIGS. 1 through 8 and/or FIGS. 11 and 12 and the discussion relating thereto also apply to the embodiments shown in FIGS. 9A, 9B, and 10. Furthermore, the relationships of transverse members 14 with respect to bases 12 may also be the same, or similar, to the configuration shown in FIG. 10.

The transverse member 14, 14a of FIGS. 9A, 9B, and 10 may be coupled to the bases 12, 12a in at least two different positions as shown in FIGS. 1 through 8 and the discussion relating thereto. The transverse member 14, 14a of FIGS. 9A, 9B, and 10 may be coupled to the bases 12, 12a such that a flat portion of the transverse members 14, 14a engage a corresponding flat portion of one of the bases 12, 12a as shown in FIGS. 1 through 8 the discussion relating thereto. The transverse member 14, 14a and bases 12, 12a of FIGS. 9A, 9B, and 10 may include a removable outer lining similar to embodiments shown in FIGS. 1 through 8 and the discussion relating thereto. Furthermore, the transverse member 14, 14a of FIGS. 9A, 9B, and 10 may include a longitudinal axis perpendicular to a plane of a support surface. The transverse member 14, 14a and bases 12, 12a of FIGS. 9A, 9B, and 10 may be removably coupled to one another by means of U-shaped and/or foot couplers similar to embodiments shown in FIGS. 1 through 8 and the discussion relating thereto.

The transverse member 14, 14a and bases 12, 12a of FIGS. 9A, 9B, and 10 may define apertures for receiving a coupler, such as a U-shaped coupler, similar to embodiments shown in FIGS. 1 through 8 and the discussion relating thereto. The U-shaped coupler can sandwich a portion of a base 12, 12a. and a transverse member 14, 14a. In some embodiments, the coupler used in the embodiments of FIGS. 9A, 9B and 10 may be a ratcheting coupler such as is illustrated in FIG. 8 and related discussion.

The coupler in the embodiment of FIGS. 9A, 9B, and 10 may include two parts having one portion connected to the base 12, 12a and another portion connected to one the transverse members 14, 14a, such as is illustrated in FIG. 8. The portions of the coupler may be manually, detachably coupled to each other.

Referring to FIGS. 11 and 12, in another embodiment, a base 312 and transverse member 314 are configured to provide a comfortable sitting surface for a consumer. Base 312 is also configured to be easily disassembled for rearranging, moving, storing and/or shipping. In this embodiment, base 312 comprises a frame assembly 316, a cushion 318 and a plurality of feet 320a-d mounted on frame assembly 316 (foot 320d is not shown). Frame assembly 316 is configured to support the weight of a consumer while the consumer is sitting on base 312. Cushion 318 is configured to be mounted on frame assembly 316 so as to provide a useful and comfortable sitting area for a consumer. Cushion 318 can be easily mounted on or removed from frame assembly 316.

Feet 320a-d are coupled to the underside of frame assembly 316. Feet 320a-d can be coupled to frame assembly 316 in a variety of ways. In one embodiment, feet 320a-d are coupled by screws. In this embodiment, feet 320a-d can be easily coupled to and/or removed from frame assembly 316 so as to facilitate ease in packaging, shipping, storing, moving and/or replacing feet 320a-d. However, feet 320a-d can be coupled to frame assembly 316 in a more permanent fashion, such as with a nail, an epoxy or glue, or any combination thereof. Feet 320a-d facilitate the coupling of transverse member 314 to base 312 when used in connection with a foot coupler, such as foot coupler 334. Feet 320a-d are further configured to support the weight of a consumer and to elevate base 312 above the floor. When feet 320a-d are coupled to frame assembly 316 by screws, the removability of feet 320a-d in conjunction with the removability of cushion 318 enables base 312 to be easily disassembled for rearranging, moving, storing and/or shipping.

The frame assembly 316 may include an internal frame covered by a liner 336 defining openings 338 for receiving a U-shaped coupler 315. The U-shaped coupler 315 may include the attributes of the U-shaped coupler 215 of FIGS. 1-8. The U-shaped coupler 315 may likewise have a strap 340 secured thereto to facilitate gripping when removing the U-shaped coupler.

The inner frame of the frame assembly 316 may define pockets or openings for receiving the U-shaped coupler. Said pockets or openings are positioned corresponding to the openings 338 in the outer liner 336. In some embodiments, one or more sides of the base 312 include two openings 338 per side (or one relatively longer opening 338). The inner frame of the frame assembly has corresponding receiving pockets or openings. The frame assembly 316 may include a rectangular inner frame and an upper surface defined by straps and/or springs extending between sides and/or ends of the inner frame for resiliently supporting the cushion 318.

The transverse member 314 may include an internal frame, one or more cushions, and an outer liner. The transverse member further includes feet 342a, 342b sized to be received within the foot coupler 334. The transverse member 314 likewise defines an opening 344 for receiving the U-shaped coupler 315. The base member 312 and transverse member 314 may include wear plates formed of a wear resistant material, such as masonite, secured to internal surfaces of internal frames of the base 312 and transverse member 314 that contact the U-shaped couplers when the U-shaped couplers are positioned within openings defined by the internal frames of the base member 312 and transverse member 314.

FIGS. 13a-16c now illustrate another manner for coupling bases and transverse members of a modular furniture assembly of the present invention together. These figures further illustrate a method for coupling feet to the base frame assemblies and transverse member frame assemblies. FIGS. 13a-16c illustrate that holes in the transverse member frame assemblies and base frame assemblies that can be used for removably connecting the frame assemblies to the feet described above, e.g., feet 20a-d, 30a-b, 320a-d, 342a-b, can optionally be used to receive a mounting platform 400 that can connect the transverse member frame assemblies and base frame assemblies together.

In FIGS. 13a-16c, instead of employing foot couplers having apertures therein that receive feet, mounting platforms 400 connect the base and transverse member frame assemblies together and a foot is mounted on the mounting platform 400. The mounting platform can receive a variety of different types of feet, mounted on different locations of the mounting platform, thereby enabling the practitioner to selectively vary the function and appearance of the resulting modular furniture assembly.

Figure 13A:
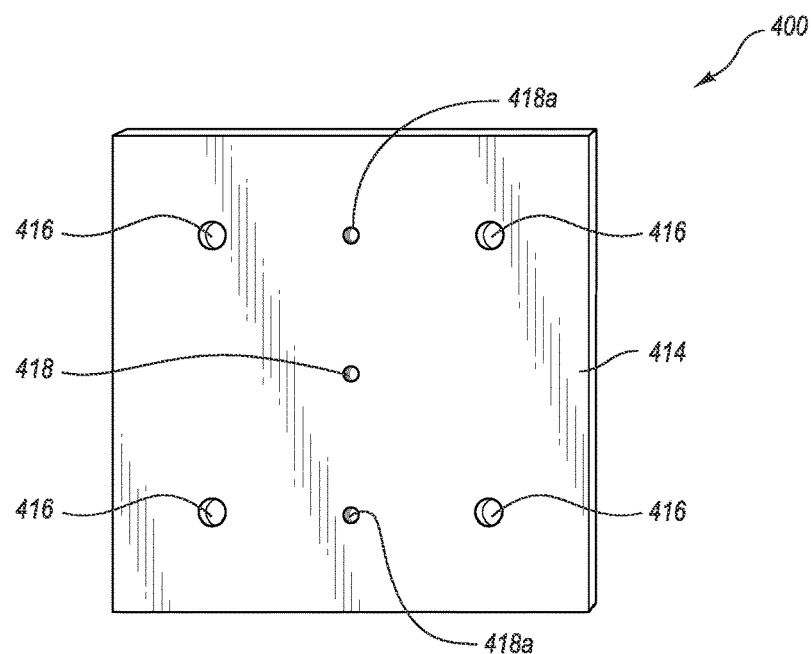
FIG. 13a illustrates a mounting platform of the present invention that is selectively mounted on a frame assembly of a transverse member and a frame assembly of a base in order to couple the frame assemblies together and to enable an alternate foot, e.g., a roller, to be coupled to the combined frame assemblies.
Figure 13B:
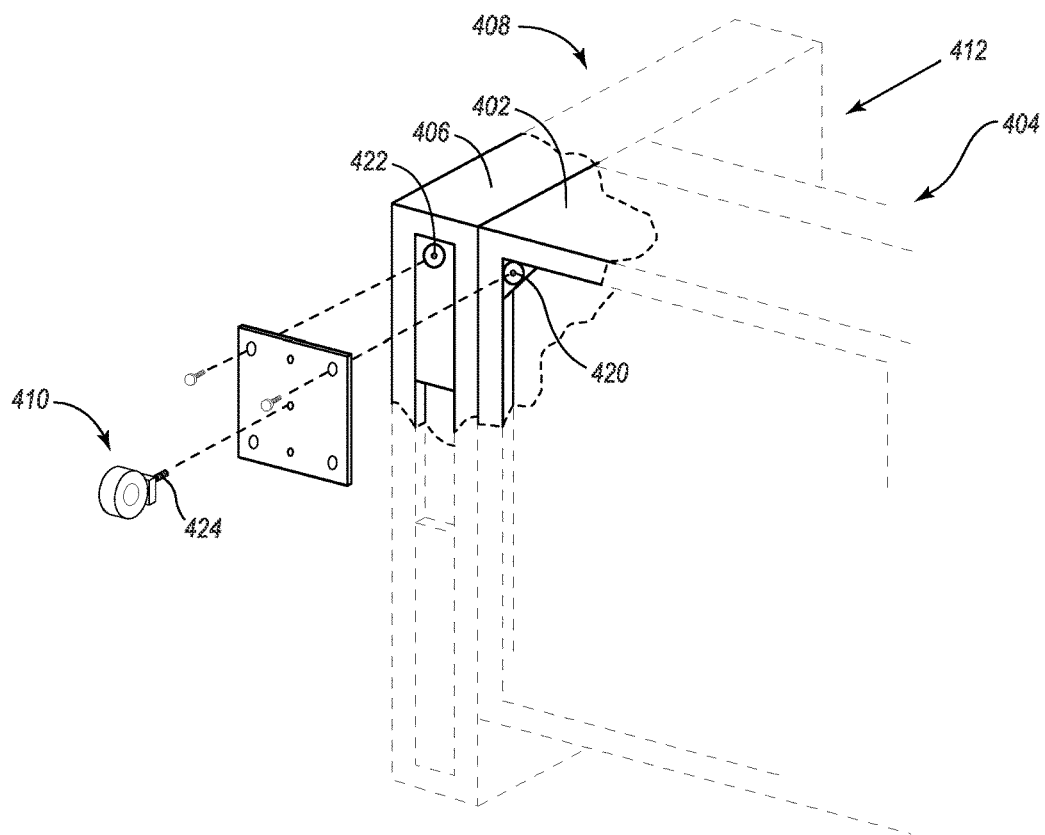
FIG. 13b is an exploded view of a mounting platform of FIG. 13a being mounted on a base frame assembly and a transverse member frame assembly and receiving a foot in the form of a roller mounted thereon.

With detailed reference now to FIGS. 13a-b, mounting platform 400 is selectively mounted onto the frame assembly 402 of the base 404 and the frame assembly 406 of the transverse member 408, thereby coupling base 404 to transverse member 408, and thereby enabling various different types of feet, e.g., rollers 410, castors, rockers, and/or pegs to be mounted on platform 400 so as to form a modular furniture assembly 412. Rollers 410, and the other feet shown in FIGS. 13b-16b are examples of mounting feet that are selectively mounted on a platform 400.

The frame assemblies 402, 406 of FIGS. 13b-16b may be the same as or similar to frame assembly 16 and frame assembly 54 of FIGS. 1-8, for example. The frame assemblies 402, 406 of FIGS. 13b-16b may also be the same as or similar to the frame assemblies of the furniture assemblies shown in FIGS. 9A-12, for example. In addition, the base 404 and transverse member 408 represented in FIGS. 13b-16b may have the same relative dimensions and relationships with respect to each other, i.e., x=y+z, as the bases and transverse members of FIGS. 1-12, for example.

FIGS. 13a-b illustrate a mounting platform 400 of the present invention that is selectively mounted on a frame assembly 402 of a base 404 and a frame assembly 406 of a transverse member 408, enabling a user to selectively couple an alternate foot, e.g., a roller 410 to the combined base/transverse member frame assembly. A variety of different types of feet, such as shown herein, can be coupled to the mounting platform 400, thereby forming different modular furniture assemblies having different shapes and types of feet.

FIG. 13a illustrates that in the embodiment of FIG. 13a, mounting platform 400 is comprised of a rigid, substantially flat plate 412 (e.g., a metallic plate, such as aluminum) having a plurality of coupling apertures 416 therethrough. Plate 412 has four coupling apertures 416, although a variety of different aperture combinations are possible. Coupling apertures 416 are spaced with respect to each other such that coupling apertures 416 correspond to the apertures 420, 422 in respective base and transverse member frame assemblies 402, 406. In one embodiment, these same apertures 420, 422 are configured to receive the threaded members of feet 320a-c, 342a-b, shown in FIGS. 11 and 12, for example.

Coupling apertures 416 are spaced equidistantly from each other in a square pattern, as are the mounting apertures of foot coupler 34a of FIG. 4 and foot coupler 334 of FIGS. 11-12. In one embodiment, the apertures 416 of platform 400 are spaced the same distance from each other, and in the same configuration as the apertures of foot coupler 34a, such that the same receiving apertures 420, 422 of the frame assemblies of base 402 and transverse member 406 can be used for either type of foot system. In one embodiment, the center of each aperture of mounting platform 400 corresponds to the center of each aperture of foot coupler 334 of FIGS. 11-12 such that the user can either use: (i) the feet and coupler of FIGS. 11 and 12, for example; or (ii) the feet and platform 400 of FIGS. 13a-14b to support the resulting modular furniture assembly on a support surface. As illustrated in FIGS. 13b, 14b, 15b, and 16b, the coupling apertures 416 of the platform 400 correspond to receiving apertures 420, 422 in the frames 402, 406.

As discussed above, in one embodiment, respective threaded receiving apertures 420, 422 of base frame assembly 402 and transverse member frame assembly 406, and similar receiving apertures on the remaining portions of the frame assemblies, are used as connection locations for feet 30a-b and 20a-d shown above in FIGS. 5a-c, and/or for feet 320a-c, 342a-b of FIGS. 11-12, for example. These same threaded receiving apertures 420, 422 and other similar threaded receiving apertures on the frame assemblies 402, 406 can be used to receive the fasteners that connect platform 400 to the frame assemblies 402, 406. Thus, in one embodiment, feet 30a-b, 20a-d, 320a-c, 342a-b can be selectively removed (e.g., unthreaded) from their respective transverse member and base frame assemblies, then platform 400 of FIG. 13a can be used to couple the transverse member and base frame assemblies together, rather than using foot couplers 34-35, 34a, or 334.

With reference to FIGS. 13a-b, central mounting aperture 418 is located in the center of the square pattern formed by the coupling apertures 416, while upper and lower mounting apertures 418a are located between respective upper and lower coupling apertures 416. The different mounting apertures 418, 418a are threaded and threadedly receive feet and enable feet to be placed in different locations, e.g., on the edge of a transverse member or base, or offset from the edge, as desired for functionality or ornamentation. In another embodiment, only a single mounting aperture is employed.

As shown in FIG. 13b, mounting platform 400 can be mounted on base frame assembly 402 and transverse member frame assembly 406 such that base 404 and transverse member 408 are coupled to each other. Once base 404 and transverse member 408 are affixed, the mounting apertures 418, 418a can be used to receive a foot, e.g, roller 410, or other feet as described herein.

In one embodiment, coupling apertures 416 are non-threaded, while mounting apertures 418, 418a are threaded. Fasteners, e.g., screws or bolts, are used to connect platform 400 to base frame assembly 402 and transverse member frame assembly 406, as illustrated in FIG. 13b. Such fasteners extend through coupling apertures 416 into the respective threaded receiving apertures 420, 422 of the base frame assembly 402 and transverse member frame assembly 406, thereby connecting platform 400 to base 404 and transverse member 408 and affixing base 404 and transverse member 408 to each other. Optionally, in one embodiment, a strong adhesive or other connection, can be used as a fastener for mounting platform 400 onto frame assemblies 402, 406. Feet, e.g., rollers 410 can be connected onto mounting platform 400, such as through the use of fasteners thereon, e.g., threaded member 424, which is selectively connected via threaded mounting aperture 418 to platform 400.

Thus, the base member frame assembly 402 and the transverse member frame assembly 406 each have an aperture 420, 422 therein for receiving a connector. A first connector, e.g., a screw or bolt, extends through a coupling aperture 416 of platform 400 and into the aperture 422 of the transverse member frame assembly 406. A second connector, e.g., a screw or bolt, extends through another aperture 416 of platform 400 and into an aperture 420 of the base frame assembly 402.

Once platform 400 is connected to frame assemblies 402, 406, feet, e.g., rollers 410 and other feet can be mounted onto platform 400, as illustrated in FIG. 14a, giving the modular furniture assembly the function and appearance of furniture with rollers, pegs, rockers, etc. Such feet are configured to contact the support surface, such as the floor or ground, when the modular furniture assembly is in an upright configuration. Platform 400 enables a variety of different types of feet to be mounted thereon, providing diversity of function and appearance.

Both the foot and foot coupler technologies of FIGS. 1-12 and the platforms 400 and feet of FIGS. 13a-16b can be shipped and sold along with corresponding bases and transverse members, providing further modularity. Thus, one embodiment of a modular furniture assembly kit of the present invention comprises: (i) a base (e.g., base 12); a transverse member (e.g., transverse member 14), each having respective removable feet and foot couplers, such as shown in FIGS. 1-12; and (iii) a platform assembly comprising platform 400, two or more fasteners (e.g., the screws or bolts of FIG. 13b), and one or more mounting feet, e.g., roller 410 that is selectively mounted to platform 400. This modular furniture assembly kit enables a user to selectively, removably use feet and foot couplers such as shown in FIGS. 1-12 or to use the platform assembly shown in FIGS. 13a-16b on the same frame assemblies, thereby enabling the user to have options for function and/or decoration of the modular furniture assembly. For example, if the user no longer wants to use the feet and foot couplers of FIGS. 1-12, the user can remove the feet and foot couplers of FIGS. 1-12 and optionally use the platform 400 and feet, e.g., foot 410 of FIGS. 13a-16b.

In one embodiment, the feet of FIGS. 1-12, e.g., feet 30a-b, 20a-d, 320a-c, 342a-b can be referred to as removable feet because they can be removed from their respective receiving apertures in their respective frame assemblies and replaced by mounting platform 400 and its associated fasteners (FIG. 13b) and mounting feet 410.

FIG. 14b illustrates a series of mounting platforms 400 being mounted on adjacent transverse members and bases so as to form a sofa assembly, such as shown in FIG. 14c. Furniture configurations similar to those shown in FIGS. 6B-6J, having feet such as rollers, pegs, castors, rockers, etc., can be formed using platforms 400 and feet mounted on the platforms 400.

FIGS. 15a-c illustrate mounting platforms 400 mounted on the frame assemblies of an adjacent base and transverse members to thereby couple the frame assemblies together. FIG. 15a illustrates a platform 400 mounted on a base frame assembly and transverse member frame assembly and a foot in the form of a peg 430 mounted on the corner edges of the platform 400. The peg 430 is further mounted through the platform 400 to a transverse member frame assembly 406, thereby connecting a portion of the platform 400 to the transverse member frame assembly 406.

FIGS. 15a-c thus illustrate that a foot, e.g., peg 430 can be used to connect platform 400 to the transverse member frame assembly 406 or the base frame assembly 402. The threaded portion of peg 430 is mounted through a coupling hole 416 of platform 400 to transverse member frame assembly 406, such that peg 430 is positioned adjacent the edge of the transverse member 408 and couples platform 400 to transverse member frame assembly 406. Thus, the threaded portion of peg 430 is an integral fastener portion of the peg 430 that fastens platform 400 to a base or transverse member frame. Thus, a foot of the present invention can be mounted on the mounting platform 400 and serve as a connector to connect the mounting platform 400 to the transverse member or base. To vary function and appearance, a fastener, e.g., a screw can replace the peg 430 from its position in the coupling aperture of FIG. 15a and the peg 430 can be mounted in one of the mounting apertures of platform 400, e.g. the central mounting aperture 418.

Peg 430 is an example of a foot that is selectively mounted on the mounting platform 400 and to one of: (A) the transverse member frame assembly 406 (see FIG. 15a); and (B) the base member frame assembly 402. Peg 430 thus includes an integral fastener that extends through an aperture 416 of platform 400 and connects to one of: (A) the transverse member assembly and (B) the base frame assembly. As shown in FIGS. 15a-b, another fastener in the form of a bolt or screw further connects another portion of the platform 400 to the base member assembly 402.

Optionally, in another embodiment, the fastener in the form of a screw or bolt can connect a portion of the platform 400 to the transverse member frame assembly, e.g., when the peg 430 connects platform 400 to the base frame assembly.

FIGS. 16a-c illustrate mounting platforms 400 mounted on the frame assemblies of an adjacent base and transverse member to thereby couple rocker members 446 to the bases and transverse members to form a rocking chair. As shown, rocker members 446, 446a have first and second connection portions, such that the rockers are fastened in two different locations to different mounting platforms 400 that are mounted on adjacent base and transverse member portions.

Thus, platform 400 and associated feet, e.g., feet 410, 430, 446 of FIGS. 13-16 can be used as substitutes for the foot couplers and feet described above with respect to FIGS. 4-5c and 11-12. Platform 400 acts as a connector to connect a transverse member frame assembly to a base frame assembly and as a mounting platform upon which a foot can be mounted. The foot can be mounted in a variety of positions on platform 400 and can also serve as a connector to connect platform 400 to a transverse member frame assembly or base frame assembly.

Platform 400 and associated feet, e.g., feet 410, 430, 446 can be used on any of the modular furniture assemblies described above in connection with FIGS. 1-12 or any other modular furniture assemblies described herein.

As mentioned above, one embodiment of the present invention further relates to a kit comprising one or more base members 12 one or more transverse members 14, one or more foot couplers 34, one or more mounting platforms 400 and associated fasteners, and one or more feet, e.g., feet 410, 430, 446, such that a user can optionally use the feet and couplers of FIGS. 1-12 (the feet being removable) or can optionally use the feet and couplers of FIGS. 13-16. This gives the user a variety of different options for arranging furniture according to a desired function and decorative style. In another embodiment, however, the platform and feet of FIGS. 13a-16b are sold and used independently from the feet and feet couplers of FIGS. 1-12.

The present invention may be embodied in other specific forms without departing from its spirit or essential characteristics. In particular references to dimensions and relationships between dimensions recited herein refer to nominal values subject to manufacturing tolerances typical in the art of furniture manufacture.

The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A modular furniture assembly comprising:
a base member having a frame assembly; and
a transverse member having a frame assembly;
a mounting platform, the mounting platform configured to be mounted on both the base member and the transverse member to thereby couple the base member to the transverse member; and
a foot configured to contact a support surface;
wherein the foot is mounted on the mounting platform, such that the foot is configured to contact the support surface when the modular furniture assembly is in an upright configuration.

2. A modular furniture assembly as recited in claim 1, wherein the base member frame assembly and the transverse member frame assembly each have an aperture therein for receiving a fastener, and wherein a first fastener extends through an aperture of the mounting platform and into the aperture of the transverse member frame assembly, and wherein a second fastener extends through an aperture of the mounting platform and into the aperture of the base member frame assembly.

3. A modular furniture assembly as recited in claim 1, wherein the foot comprises a peg.

4. A modular furniture assembly as recited in claim 1, wherein the platform comprises a rigid plate having apertures therethrough.

5. A modular furniture assembly as recited in claim 4, wherein the apertures comprise four apertures.

6. A modular furniture assembly as recited in claim 5, wherein the apertures are placed in a square pattern equidistantly from each other.

7. A modular furniture assembly as recited in claim 1, wherein the base member has a seating surface, and the transverse member has a height that is substantially greater than the height of the seating surface of the base member.

8. A modular furniture assembly as recited in claim 1, wherein the platform comprises a substantially flat plate having apertures therethrough.

9. A modular furniture assembly as recited in claim 1, wherein the foot is mounted at a corner of the mounting platform.

10. A modular furniture assembly comprising:
a base member having a frame assembly, the base member having a seating surface; and
a transverse member having a height that is substantially greater than a height of the seating surface of the base member, the transverse member having a frame assembly;
a foot configured to contact a support surface; and
a mounting platform, the mounting platform configured to be mounted on both the base member and the transverse member to thereby couple the base member to the transverse member;

wherein the foot is mounted on the mounting platform, such that the foot is configured to contact the support surface when the modular furniture assembly is in an upright configuration.

11. A modular furniture assembly as recited in claim 10, wherein the foot comprises a peg.

12. A modular furniture assembly as recited in claim 10, wherein the platform comprises a rigid plate having apertures therethrough.

13. A modular furniture assembly as recited in claim 10, wherein the foot is removably mounted on the mounting platform.

14. A modular furniture assembly comprising:
- a base member having a frame assembly, the base member having a seating surface; and
- a transverse member having a height that is substantially greater than a height of the seating surface of the base member, the transverse member having a frame assembly;
- a foot configured to contact a support surface; and
- a mounting platform having the foot mounted thereon, the mounting platform configured to be selectively mounted on bottom surfaces of the respective base member and transverse member to thereby couple the base member to the transverse member with the base member abutting the transverse member;
- such that the foot is configured to contact a support surface when the modular furniture assembly is in an upright configuration.

15. A modular furniture assembly as recited in claim 14, wherein the foot is mounted in the middle of the mounting platform or on a corner of the mounting platform.

16. A modular furniture assembly as recited in claim 14, wherein the foot comprises a peg.

17. A modular furniture assembly as recited in claim 14, wherein the platform comprises a rigid plate.

18. A method for forming a modular furniture assembly, the method comprising:
- providing a base member having a frame assembly;
- providing a transverse member having a frame assembly;
- providing a mounting platform, the mounting platform configured to be mounted on both the base member and the transverse member to thereby couple the base member to the transverse member, the mounting platform having a foot mounted thereon, wherein the foot is configured to contact the support surface when the modular furniture assembly is in an upright configuration;
- placing the base member in an abutting relationship with the transverse member; and
- mounting the mounting platform on bottom surfaces of the base member and the transverse member to thereby couple the base member to the transverse member.

19. A modular furniture assembly as recited in claim 18, wherein the foot comprises a peg.

20. A modular furniture assembly as recited in claim 19, wherein the platform comprises a rigid plate having four apertures therethrough.

* * * * *